US012762552B2

(12) United States Patent
Higgins et al.

(10) Patent No.: US 12,762,552 B2
(45) Date of Patent: Oct. 13, 2026

(54) DISTRIBUTED LEDGER COMPUTING PLATFORMS AND ASSOCIATED METHODS, SYSTEMS AND DEVICES

(71) Applicant: Christopher Lyndon Higgins, Galston (AU)

(72) Inventors: Christopher Lyndon Higgins, Noosa Heads (AU); Nicholas David Beaugeard, Dee Why (AU); Lyndon Hamilton Higgins, North Epping (AU)

(73) Assignee: Christopher Lyndon Higgins, Galston (AU)

( * ) Notice: Subject to any disclaimer, the term of this patent is extended or adjusted under 35 U.S.C. 154(b) by 786 days.

(21) Appl. No.: 17/429,348

(22) PCT Filed: Feb. 10, 2020

(86) PCT No.: PCT/IB2020/051039
§ 371 (c)(1),
(2) Date: Aug. 9, 2023

(87) PCT Pub. No.: WO2020/161688
PCT Pub. Date: Aug. 13, 2020

(65) Prior Publication Data

US 2023/0245117 A1 Aug. 3, 2023

(30) Foreign Application Priority Data

Feb. 8, 2019 (AU) ................................ 2019900403
Mar. 17, 2019 (AU) ................................ 2019900875
(Continued)

(51) Int. Cl.
*G06Q 20/38* (2012.01)
*G06Q 20/40* (2012.01)

(52) U.S. Cl.
CPC ......... *G06Q 20/389* (2013.01); *G06Q 20/401* (2013.01)

(58) Field of Classification Search
CPC .... G06Q 20/389; G06Q 20/401; H04L 67/02; H04L 9/0891; H04L 2209/56;
(Continued)

(56) References Cited

U.S. PATENT DOCUMENTS 12,131,318 B2 * 10/2024 Higgins .................. H04L 63/12
2017/0149774 A1 * 5/2017 Blinn .................... H04L 63/083
(Continued)

FOREIGN PATENT DOCUMENTS

CN 107911421 A 4/2018
WO 2017109140 A1 6/2017
(Continued)

OTHER PUBLICATIONS

Mastering Bitcoin (Year: 2014).*
(Continued)

*Primary Examiner* — James H Miller
(74) *Attorney, Agent, or Firm* — BRYAN CAVE LEIGHTON PAISNER LLP

(57) ABSTRACT

A distributed computing system, platform and method configured to enable the generation of a network of users of the system to participate in one more transactions and having, a network of user nodes in communication with one another, each node being associated with at least one processor and at least one computer readable medium for executing the one or more transactions with other user nodes in the network; a distributed ledger system capable of creating, maintaining and updating at least one blockchain indicative of the one or more transactions via the network of user nodes; and one or more databases accessible by the network of nodes for
(Continued)

recording and reading data relating to the one or more transactions between the user nodes.

15 Claims, 11 Drawing Sheets

(30) Foreign Application Priority Data

| | | |
|---|---|---|
| Mar. 19, 2019 | (AU) | 2019900898 |
| Mar. 27, 2019 | (AU) | 2019901022 |
| Apr. 3, 2019 | (AU) | 2019901127 |
| Apr. 7, 2019 | (AU) | 2019901191 |
| Apr. 7, 2019 | (AU) | 2019901192 |
| Apr. 9, 2019 | (AU) | 2019901202 |
| Apr. 14, 2019 | (AU) | 2019901288 |
| Apr. 14, 2019 | (AU) | 2019901289 |
| May 13, 2019 | (AU) | 2019901617 |
| May 13, 2019 | (AU) | 2019901625 |
| May 13, 2019 | (AU) | 2019901632 |

(58) Field of Classification Search
CPC ......... H04L 9/3231; H04L 67/10; H04L 9/50; G06F 16/27
See application file for complete search history.

(56) References Cited

U.S. PATENT DOCUMENTS

| | | | | |
|---|---|---|---|---|
| 2017/0366353 | A1* | 12/2017 | Struttmann | G06F 21/6218 |
| 2018/0198624 | A1* | 7/2018 | Bisti | H04L 9/3247 |
| 2018/0204213 | A1 | 7/2018 | Zappier et al. | |
| 2018/0218003 | A1* | 8/2018 | Banga | G06F 16/137 |
| 2018/0255090 | A1* | 9/2018 | Kozloski | H04L 67/02 |
| 2018/0307859 | A1 | 10/2018 | Lafever et al. | |
| 2020/0082390 | A1* | 3/2020 | Mursalov | G06Q 20/381 |
| 2021/0397701 | A1* | 12/2021 | Parinov | G06F 21/6263 |
| 2022/0019575 | A1* | 1/2022 | Qian | G06F 16/2365 |

FOREIGN PATENT DOCUMENTS

| | | | | |
|---|---|---|---|---|
| WO | 2018064487 | A1 | 4/2018 | |
| WO | WO-2019040119 | A1 * | 2/2019 | H04L 9/50 |
| WO | WO-2020150185 | A1 * | 7/2020 | H04L 9/50 |

OTHER PUBLICATIONS

Crypto-mining Application Fingerprinting Method (Year: 2018).*
Digging into Browser-based Crypto Mining (Year: 2018).*
Web-based Cryptojacking in the Wild (Year: 2018).*
A Blockchain-based Decentralized Data Storage and Access Framework for PingER (Year: 2018).*
Mcconaghy et al. "BigchainDB: A Scalable Blockchain Database", (Jun. 8, 2016), pp. 1-64, XP055340139.
Muzammal et al. "Renovating blockchain with distributed databases: An open source system", Future Generation Computer Systems, (Jul. 31, 2018), pp. 105-117, XP055632882, DOI: 10.1016/j.future.2018.07.042.
S. Nakamoto, "Bitcoin: A Peer-to-Peer Electronic Cash System" (2010), pp. 1-9, XP055386799.
Ruth et al. "Digging into Browser-based Crypto Mining", Proceedings of the Internet Measurement Conference (2018), pp. 70-76, XP081077188.
Andreasson et al. "Rymd Distributed Encrypted Peer-ToPeer Storage", EPO Form 2916 01.91 TRI Bachelor's thesis in Computer Science, Chalmers University of Technology (2014), XP055729544.
Ko et al. "Dynamic Analysis Framework for Cryptojacking Site Detection", Journal of The Korea Institute of Information Security & Cryptology, vol. 28, No. 4, (Aug. 2018), pp. 963-974, XP055729548.
Berger et al. "Best database type to store data that will be used with a blockchain?", Stack Overflow, (Feb. 18, 2018), XP093235761, URL:https://stackoverflow.com/questions/48844682/best-databasetype-to-store-data-that-will-be-used-with-a-blockchain [retrieved on Dec. 19, 2024.
Antonopoulos "Mastering Bitcoin—Unlocking Digital Cryptocurrencies", Book, (Dec. 3, 2014), pp. 1-298, XP093327400, Sebastopol, CA, US ISBN: 9781491902639.

* cited by examiner

DISTRIBUTED LEDGER COMPUTING PLATFORMS AND ASSOCIATED METHODS, SYSTEMS AND DEVICES

FIELD OF THE INVENTION

The invention relates to an improved computer architecture and software supporting simpler and more secure blockchains together with methods and systems for developing efficient blockchain business solutions.

BACKGROUND TO THE INVENTION

Whilst a blockchain is useful for irrefutably storing a sequence of transactions using a peer-to-peer platform, they are considered slow as databases when compared to what is possible for high volume digital transaction technology that we see today with Visa and PayPal.

There may be future improvements to blockchain or distributed ledger performance, but the nature of blockchain technology requires that some speed be sacrificed. The way distributed networks are employed in blockchain technology means the participating nodes do not share and compound processing power, they each independently service the network, then compare the results of their work with the rest of the network until there is a consensus that something happened.

Centralized databases, on the other hand, have been around for decades, and have certain advantages and have seen their performance increase in line with a formula that has often been applied as a measure of innovation in the digital era: Moore's Law[1].

[1] https://www.britannica.eom/technology/transistor#ref837049

TABLE 1

| Activity | Database | Blockchain |
|---|---|---|
| Read (Sequential) | Fast | Fast |
| Read (Random) | Fast | Slow |
| Query | Fast | Very Slow |
| Write | Fast | Quick, Slow to Validate |
| Delete | Fast | Cannot |
| Update | Fast | Cannot |
| Immutable record | No | Yes |

So, as can be seen from Table 1 above, setting out the general performance characteristics, blockchains are really good at storing a sequential series of immutable transactions and databases are good for random access (read, write and query) together with ability to update or delete.

It is the object of the present invention to provide alternative solutions to the abovementioned, or to at least provide the public with a useful choice.

SUMMARY OF THE INVENTION

Many applications would benefit having the features and performance of a database as well as the features of a blockchain.

In one aspect the invention may broadly be said to consist of a distributed ledger system configured to create, update and maintain at least one blockchain indicative of transactions performed by a network of users of the system, the system comprising:

- a network of computing devices including a network of user nodes in communication with one another to participate in transactions and subsequently write the transactions to an associated blockchain, each node being associated with at least one processor and at least one computer-readable medium having recorded thereon instructions to be executed by the processor(s) to carry out one or more blockchain-related tasks for creating, updating and/or maintaining at least one associated blockchain of the system based on the transactions; and
- wherein the network of computing devices is operable to enable at least one ephemeral user node to join the network of computing devices to carry out the blockchain-related tasks in association with at least one blockchain during an active session of the ephemeral user node.

In another aspect the invention may broadly be said to consist of a method for maintaining at least one blockchain stored in a distributed ledger system, the method comprising:

- enabling communication between a network of computing devices including a network of user nodes of the system, to enable execution of one or more transactions between multiple user nodes and to enable writing of the transaction(s) to an associated blockchain,
- providing an interface for the network of computing devices to access at least one computer-readable medium having recorded thereon instructions to carry out one or more blockchain-related tasks for creating, updating and/or maintaining at least one associated blockchain of the system based on the transactions, and to allow each computing device to execute the blockchain-related tasks; and
- enabling at least one ephemeral user node to join the network of computing devices and to access the at least on computer-readable medium to execute the blockchain-related tasks in association with at least one blockchain during an active session of the ephemeral user node.

In another aspect the invention may broadly be said to consist of a distributed computing system configured to enable a network of users of the system to participate in one more transactions:

- a network of user nodes in communication with one another, each node being associated with at least one processor and at least one computer readable medium for participating in the one or more transactions with other user nodes in the network;
- a distributed ledger system capable of creating, maintaining and updating at least one blockchain indicative of the one or more transactions via the network of user nodes; and
- one or more databases accessible by the network of nodes for recording and reading data relating to the one or more transactions between the user nodes.

In another aspect the invention may broadly be said to consist of a method for enabling a network of users to participate in one more transactions, comprising the steps of:

- enabling a network of user nodes to communicate with one another and participate in one or more transactions amongst two or more nodes, each node being associated with at least one processor and at least one computer readable medium for executing the transaction(s);
- utilising one or more databases accessible by the network of nodes for creating, maintaining and updating the one or more transactions between the user nodes; and creating, maintaining and updating at least one blockchain indicative of the one or more transactions in a distributed ledger system via the network of user nodes.

In another aspect the invention may broadly be said to consist of a computing platform for enabling the development of a distributed computing system application running on a user's computing device including at least one processor and at least one computer readable medium, the platform comprising:

one or more application interfaces for enabling the generation of a user node application executable on a user's computing device, the user node application having the functionality of:

communicating with other user node application(s) in a network of user nodes to perform one or more transactions with the other user node application(s), performing one or more blockchain-related tasks to create, maintain and/or update at least one blockchain indicative of the one or more transactions; and access and update one or more databases for recording and reading data relating to the one or more transactions between the user node and the other nodes.

Any combination of one or more of the features listed in the following embodiments or further aspects may be combined with any one of the abovementioned aspects of the invention.

In some embodiments the data relating to the at least one blockchain comprises data indicative of the one or more transactions of the associated blockchain.

In some embodiments wherein at least one of the databases is a NoSQL database.

In some embodiments each user node is configured to access data relating to transactions associated with the user node.

In some embodiments at least one blockchain storing one or more transactions using the distributed ledger system is substantially synchronised with associated copies of the one or more transactions in the at least one database.

In some embodiments the non-SQL database stores data indicative of a status of one or more transactions between user nodes.

In some embodiments the non-SQL database is utilised to record blockchain-related transactions between the user nodes.

In some embodiments each user node is configured to execute data access layer software for translating blockchain-related transaction data acquired from the at least one database to data suitable for use as a transaction in the distributed ledger system.

In some embodiments each user node is configured to execute data access layer software for translating blockchain-related transaction data acquired from the distributed ledger system to data suitable for use to store as a transaction in the at least one database.

In some embodiments each user node is configured to execute database management software for enabling the node to create, read, update and/or delete one or more blockchain related transactions on the at least one database.

In some embodiments each user node is configured to execute database management software for enabling the node to transmit one or more blockchain related transactions stored in the at least one database to the user node for use in distributed ledger system.

In some embodiments each user node is configured to execute node software for performing the one or more blockchain related tasks.

In some embodiments each computing device is configured to execute address filtering software for identifying blockchain-related transactions originating from the node software or from the database management software for a particular user node, for one or more user nodes or databases.

In some embodiments at least one user node is an ephemeral node configured to temporarily join the network of user nodes to carry out the blockchain-related tasks in association with at least one blockchain during an active session of the ephemeral user node.

In some embodiments the network of user nodes is operable to enable at least one ephemeral user node to repeatedly join the network of computing devices to carry out the blockchain-related tasks in association with at least one blockchain during multiple active sessions.

In some embodiments the node is configured to access and execute the blockchain-related tasks via a web browser instance operable using the processor(s) associated with the node.

In some embodiments the node is configured to access and execute the blockchain-related tasks using a webAssembly container.

In some embodiments all nodes are ephemeral nodes.

In some embodiments at least one node is an ephemeral node, and the ephemeral node is configured to maintain a full copy of the blockchain or an ephoch of the blockchain.

In some embodiments the network of nodes comprises at least one ephemeral node operating as a full-node, wherein the full-node is operable to execute a mining task of the blockchain-related tasks for selecting a node within the network to write a next validated block to the blockchain.

In some embodiments the mining task is operative using a proof-of-stake method.

In some embodiments the network of nodes is capable of communicating with one another via a peer-to-peer communications protocol.

In some embodiments the peer-to-peer communication is facilitated by webRTC.

In some embodiments one or more transactions executed and stored via the distributed ledger system and/or via the database have associated therewith any one or more of the following identifiers: user identifier, blockchain identifier, hierarchy level identifiers associated with a hierarchy system for a group of the user nodes, and/or an entity identifier associated with a user node.

In another aspect the invention may broadly be said to consist of a distributed computing platform, providing general purpose computing coupled with a ledger comprising:

A software construct or platform to process code and create and compile and deliver an application designed to run in a web browser, said application having a distributed ledger or blockchain and for each user a corresponding indexed database dedicated the user.

In some embodiments the indexed Database is capable of communicating database transactions to other software applications which translates or manipulates each database transaction into a form suitable to be received and processed as a blockchain or distributed ledger transaction by said blockchain node.

In some embodiments each application created on the platform software to has a unique ledger identifier GUID and is part of the Platform's ecosystem, enabling communication between ledgers.

In some embodiments applications created on or by the platform may also run-on large-scale devices or Servers or cloud-provided scalable computing or traditionally in existing datacentres.

In some embodiments some applications created on or by the platform may run using headless chrome instead of a web browser.

In some embodiments the platform enables the development of a software application running in a web-browser in a user device to distribute database transactions to a corresponding node in said application in a form suitable for creation of a blockchain transaction and transmit said transactions securely across a peer-to-peer network as corresponding blockchain or distributed ledger transactions.

In some embodiments each application instance runs a node, and the local database only holds transaction data that are relevant to the system, application or user.

The following disclosure summarises various embodiments or aspects of the invention, and any one or more features of the following disclosure may be combined with any one or more of the abovementioned aspects of the invention.

Considering the features highlighted in Table 1 above, it may therefore be of great benefit to be able to use a blockchain as a way of synchronising data between a blockchain instance running a fully operational or participating ephemeral or otherwise blockchain node and one or more SQL or Non-SQL Databases[2]. That is the transactions can be written to one or more of both a blockchain and a database and including a local database in a User/Client device which could, for example, be set up to contain only transactions with addresses of the user associated with the User/Client device. Said addresses are user addresses i.e. they relate to entities desiring or requiring the benefits of both database and blockchain to be available to them on their PC's or tablets or mobile phones or such others of devices running a web browser[3], (user, users, User Users) and to provide said benefit to Users it is proposed to use one or more of distributed ledgers or blockchains (blockchains) as a way of synchronising data between a blockchain instance running fully operational or participating, ephemeral or otherwise, blockchain nodes and one or more SQL or Non SQL Databases or Indexed Databases such as or similar to IndexedDB[4].

[2] https://medium.com/xplenty-blog/the-sql-vs-nosql-difference-mysql-vs-mongodb-32c9980e67b2

[3] https://en.wikipedia.org/wiki/Web_browser

[4] https://developers.google.com/web/ilt/pwa/working-with-indexeddb

It is proposed that Applications employing the present invention would operate as if the said Application was addressing a database and the transactions or messages to create read, update or delete transactions in the database are passed to a data access layer API (DAL) which manages or assembles transactions messages so they can be passed to Node management software and or to Database management software and written to one or more of or both of blockchains and databases and including one or more local databases in a User device. Said Databases in said User device could, for example, be set up to contain only transactions with addresses and private keys of the user and or associated with the User device and/or addresses and the private keys of said addresses granted to or provided by others on a commercial basis or otherwise to the User. Said addresses are user addresses or addresses necessary or useful for the User to be able to perform actions including gain access to, or run certain applications i.e. addresses for which the User has the private key (Addresses). Said addresses may contain an indicator or code to identify the type of transaction and/or the ID of a blockchain to assist in determining the actions to be taken by software managing the system.

Said local database would provide instant access for a User to create, read, update or delete transactions whilst also creating and adding the transaction to a queue of proposed transactions for the next block to be written into a blockchain and write into the next block in a blockchain. Transactions in the blockchain and database may for example contain the executable code of any Application capable of running in a web browser and which can be launched and run within the User device without or at least with minimal dependency on a central server or database.

The sequentially written blockchain records could as necessary be read and or searched and records recovered and compared with a corresponding database to verify that the said database reflects exactly the transactions in the blockchain. Said blockchain transactions could be written out again to refresh an existing database or create another or copy database. For example if a User obtained a new Address then upon demand or automatically on detection of a new address the management system could launch an update of a users database by "replaying" the blockchain to filter into the Users database all blockchain transactions having addresses and private keys, including said new address, to which the Users Node management software has access.

User/Clients addresses created by the User in relation to one or more Blockchains and which said addresses must be recorded to identify each of transactions initiated by a user on each particular blockchain and said addresses may include a two part or second address identifier with one part or address identifying a particular blockchain or distributed ledger system and a second part or address is the user address and said addresses or either of their parts identify which transactions are to be added to the local database or databases maintained on each User device.

With the database and Blockchain records in a state of synchronisation the Database can provide fast access for all Users purposes including creating a new transaction or updating an existing transaction or deleting a transaction. The system will reflect these Database transactions by creating corresponding blockchain transactions. The Database is of course updated immediately so the user has instant access to all transactions information. There is some delay between the writing of a database.

The operating code of the system 1) identifies which transactions in a blockchain have been applied/added to User databases and
2) decrypts said blockchain transactions having an address relating to the User and said address and private key of said address available to the Node software and adds as transactions to the User database said blockchain transactions
3) in addition, when database transactions are initiated by a User running an application and after passing said transaction to a Data Access API Layer for translation or manipulation as necessary into
a) input for Database software to immediately write the transaction to the User database with a flag as necessary to indicate a transaction not yet written to the blockchain. Once said candidate block has been validated and written and added to the blockchain or distributed ledger, said flag is removed.
b) and also input to, and in a form for, the Node software to receive the data as a transaction to be placed in the queue of proposed transactions to be written to the blockchain (candidate blocks) and subsequently written to the blockchain. Said transaction data sent to said node may include compiled computer code.

c) the system can be arranged so that at least a copy of the transaction data is in a proper form and said data passes straight to the User database from the APP 4) a) In another embodiment at this point—All blockchain nodes receive a copy of new blocks after they are written to the said blockchain and upon receipt of a new block a Node i) commences validation of new block & upon validation of said new blocks then applies an address filter to identify any of the new transactions with addresses matching any of the addresses associated with said node or its user client account or User device and for which addresses the Node has access to private keys of the said addresses, so that these "identified" transactions can then be de-crypted and passed to the Database API Layer for translation or manipulation into a form suitable for a database transaction and said translation can then be passed to the Database Software which writes the "identified" transaction to a database.

ii) Some transactions in said new blocks may confirm earlier transactions written to the database with a flag have now been written to the blockchain. Upon receipt of said confirming transaction having been written to the blockchain, said flag is removed.

b) in yet another embodiment—

Blockchain nodes receive a copy of new blocks after they are written to the said blockchain and upon receipt of a new block a Node commences:— a) commences validation of new block & upon validation of said new blocks then applies an address filter to identify any of the transactions in the new block with addresses matching any of the addresses associated with said node or its user client account or User device and for which addresses the Node has access to private keys of the said addresses, so that these "identified" transactions can then be de crypted and passed to the Data Access Layer API.

b) Updating the Database directly by executing the code in the transaction to update the database or c) translation or manipulation into a form suitable for a database transaction and said translation can then be executed directly to update the database or passed to the Database Software which writes the "identified" transaction to a database.

d) Some transactions in said new blocks may confirm earlier transactions written to the database with a flag that have now been written to the blockchain. Upon receipt of said confirming transaction having been written to the blockchain, said flag is removed or replaced by an indicator that the transaction is recorded in the blockchain In one or more alternate embodiment the operating code of the system 1) identifies which transactions have been applied/added to the database and 2) adds new transactions to the database.

3) In addition when database transactions are initiated by a User/Client running an application and after translation via a Data Access API Layer into input as a blockchain transaction for the Node software or input in a form for the Node software to see the data as a transaction to be placed in the queue to be written to the blockchain (candidate blocks), said candidate block transactions can be written to the database immediately with a special indexed flag so they can be removed and changed. Once the candidate block, containing the relevant flagged transaction, has been validated and written and added to the blockchain or distributed ledger, the blockchain node associated with the User/Client account or User/Client device receives new blockchain or new blocks and i) commences validation of new blocks & upon validation of said new blocks then either ii) sends all the transactions from said new blocks either to (1) the Data Access API Layer software which applies an Address Filter to identify any of the new transactions that have addresses matching any of the addresses associated with or relevant to the present user client account or User/Client device and these "identified" transactions are transacted or manipulated so the data then sent to, and be written by, the Database Software to a database or (2) the Database Software which applies an Address Filter to identify any of the new transactions that have addresses matching any of the addresses associated with or relevant to the present user client account or User/Client device so that these "identified" transactions are sent to or reside in & can then be written by the Database Software to a database, preferably to an indexed non SQL database

OR ii) Said node software applies an address filter to identify any of the new transactions contain addresses matching any of the addresses associated with said node or its user client account or User/Client device so that these "identified" transactions can then be passed to the Database API Layer for translation and said translation can then be passed to the Database Software which writes the "identified" transaction to a database.

The foregoing methods and systems have a number of benefits vs traditional systems and methods of working, not the least that it can provide a distributed platform whereby minimal infrastructure is required to run applications and complex multiuser applications can operate securely without the requirement for extensive hosting services.

The following blockchain system related terminology is used in this specification:

A blockchain is a theoretical construct of blocks of data connected together using hash pointers. Common use of blockchain includes the theory coupled with various tools and software, and solutions implemented thereon.

A node is a software application which participates in the management of the blockchain itself.

A wallet is a piece of software which communicates with and proposes blocks for, the blockchain.

webAssembly or WASM is a novel technology whereby common browsers operate a stack based virtual machine that allows common development languages to be compiled for it.

Blazor is an experimental framework allowing Net code to run under WebAssembly.

webRTC is a proposed standard for peer-to-peer data, voice and video conversations between computers running browsers.

A non limiting example of a blockchain system in in the present invention is as follows Nodes are ephemeral, that is they do not and are not expected to run permanently. A node may launch and exit before obtaining a full cache of the current blockchain epoch.

A blockchain may be expressed as follows.

| Item | Description |
|---|---|
| Index | Index of current block |
| Nonce | Current Random Seed |
| Previous Hash | Hash of the Previous Block |
| Current Hash | Hash of this Block |
| Data [ ] | Array of byte[ ] containing MSIL |
| epoch | Current epoch of this block |

Each block is given a unique index which is incremented each time a new block is written to the chain. The Nonce is a randomised number, written by the last node to write the blockchain to help choose the next node to write a block. The Previous Hash is a Sha256 of the previous block. The Current Hash is a Sha266 of the current block. The Data[ ] is an array of one or more byte arrays containing unique .Net Standard partial objects (see objects below) The Epoch is the current iteration of the chain. Participating nodes need only request the current epoch and do not have to download the entire chain.

Peer to Peer Peer to peer communication between nodes is performed using WebRTC. WebRTC allows for peer nodes to communicate and run the network. The network is managed as follows:

The steps to run the network are as follows:

1. New transactions are broadcast to all nodes.
2. Each node collects new transactions into a block.
3. Each node leverages a proof of stake.
4. When a node has an appropriate proof-of-stake, it broadcasts the block to all nodes.
5. Nodes accept the block only if all transactions in it are valid and not already spent.
6. Nodes express their acceptance of the block by working on creating the next block in the chain, using the hash of the accepted block as the previous hash. Nodes always consider the longest chain to be the correct one and will keep working on extending it. If two nodes broadcast different versions of the next block simultaneously, some nodes may receive one or the other first. In that case, they work on the first one they received, but save the other branch in case it becomes longer. The tie will be broken when the next proof-of-stake is found and one branch becomes longer; the nodes that were working on the other branch will then switch to the longer one.

Transactions

Transactions are actually dot net standard compliant software constructed as a partial class of the GoTransaction class. This code is sent to the server as plain text and is compiled into a byte array which is written to the blockchain and then can be executed by any node.

Node Collaboration

Go:) or go is a reference or descriptor of an element of the present invention.

A Node is considered to be any program which communicates on, collaborates on or works with the Go:) Blockchain Go:) Blockchain is a blockchain instantiated in Microsoft. Net which includes in its transactions payload compiled MSIL which contains the go.Transaction class. MSIL stands for Microsoft Intermediate Language.

During the compile time, the compiler converts the source code into Microsoft Intermediate Language (MSIL). Microsoft Intermediate Language (MSIL) is a CPU-independent set of instructions that can be efficiently converted to native machine code. During the runtime the Common Language Runtime (CLR)'s Just In Time (JIT) compiler converts the Microsoft Intermediate Language (MSIL) code into native code to the Operating System.

Transactions Transactions are any action that can be encapsulated as part of the go.Transaction class which includes:

**go.Transaction.Pay(payor, payee, amount, balance)—Pays the payee the amount of tokens, leaving the balance to the payor.

**go.Transaction.Message(src, dst, msg)—Sends a msg (message) from src(Source) to dst(Destination), encrypted with dst's Public Key and signed with src's private key, Transactions operate as follows:

1. A Transaction is initiated by our software and sent to the node running in our software. A Transaction is sent to a node as compiled C#. A server compiles it but the client could compile it or a serverless function could be used.
2. The Node runs unit tests against it to prove it works as expected and if it does, it adds it to a local queue of candidate transactions.
3. The candidate transaction is sent to each peer, parent and child to validate and adding to their queue (as in step 2)
4. The Founder Node writes all valid transactions to a block which is transmitted to each peer, parent and child to validate and if validated adding to their version of the blockchain.
5. On reception of a valid block, all nodes remove, any listed candidate transactions included in the block, from their queue.

Node A Node is a specific software component, and nodes take one of several roles which may not necessarily persist for any period:

1. Full Node Manages the entire blockchain and checks validity of each block.
2. Founder Nodes write blocks to the blockchain based on votes provided by members with coins
3. Epoch Node Manage the entire epoch of a blockchain and checks validity of each block
4. Wallet—is a piece of software which communicates with and proposes blocks for, the blockchain.

It should be noted that our node software is one library and nodes may change roles/take different roles.

Node Communications

Nodes have a single parent and 1 or more children. Nodes send information to their children and receive information from the parent.

Wallet Nodes cannot be Parents

Children can be Full Nodes, Founders, Epoch Nodes and Wallet

When a Node has too many children (>MAX_CHILDREN), it instructs the first active node that connected to become a parent and send any new registered nodes to the child. Current proposal is to specify Max Children greater than 1 and less than 1000 and currently preferred as 20. If a child reports back that it cannot find the allocated parent, the node allocates the 2nd (and so on) active node to become a parent.

The hierarchy can be as deep as we wish.

We can tweak MAX_CHILDREN

The top MAX_CHILDREN nodes are created as Full Nodes and operate as follows:

1. The First Node comes up, attempts to contact every active Node in a loop.
   a) If it contacts a Node, and there are less than MAX_CHILDREN active Nodes, it becomes a top tier Node and requests the blockchain from another (random node)
   b) If it cannot contact any other node, it becomes a Full Node and requests the blockchain from the DB
   c) Every time one of these nodes gets a block, it checks it for validity and if valid checks with the DB. If its chain is longer, it writes to the DB
   d) If its chain is shorter, it reloads the chain from the DB and revalidates it.
2. Every time a node comes up, it checks to see if there are MAX_CHILDREN active and if there are less than MAX_CHILDREN, it becomes a full Node
3. If there are >=MAX_CHILDREN Active Nodes, our new node attempts to become a child of a random node. That node may reply as follows: a. DENIED—Cannot become a child for some reason, find another node b. NEXT_STEP—I already have MAX_CHILDREN Nodes, here is a list of them, attempt to become a child of one of them c. APPROVED—You then become a child of that node. Founder Nodes are special.

Each time a block needs to be written, Users with Tokens can vote on who can write the block based on Ping Time and UpTime or some other measure of Node performance, can vote with their number of tokens. The Peer with the top votes (or >50% available votes) becomes a Founder and is allowed to write the next block.

The Founder Node transmits the new block to all PARENTS and CHILDREN and PEERS

The top NODES are PEERS All Children of a Node are PEERS and can talk to each other.

Node Communications

Node Communications are as follows:

PING—Checks to see if a node is alive. Respond Alive or nothing
   Nodes which receive a PING must respond with ALIVE NEWTRANS Sending a new proposed transaction
   Nodes which receive a new proposed transaction respond with an ACK or Acknowledgment.
   They then validate the transaction and if valid, add it to their list of pending transactions and forward it to every peer, child and parent NEWBLOCK Sending a new Blockchain
   Nodes which receive a new blockchain must compare with the current length
   If the new blockchain is shorter, discard
   If the new blockchain is longer, validate then adopt
   If adopted, they need to send new blocks to every peer, child and parent REQ_CHILDREN—Request for a collection of this nodes Children
   Nodes that receive this request must respond with a list of children.

CHILDREN—Response, a Collection of this blocks children
   Nodes which have requested this must process this for the reason they requested it.
   If a node receives a CHILDREN unsolicited, it must reduce the amount it trusts the node that sent it.

REQ_PEERS—For a Child Node, it is requesting a list of its PEERS
   If a node receives this from a registered child, it must respond with a list of its (the receivers) children which will equate to the peers of that node.

REQ_CHAIN—Request for the Blockchain
   Any node receiving this request, must respond with the blockchain.

REQ_EPOCH—Request for an Epoch
   Any node receiving this request must respond with the Epoch ADDVOTE—Receive a vote from a User—Uses the blockchain to look up their current balance
   Any Node receiving this, with a list of pending transactions adds it to their votes until they calculate they have >50% of the votes and then they become founder node for the next block and may write a new block and transmit it.

CHAIN—Response of the Whole Blockchain
   Any node which asks for this will receive it
   Any node receiving this unsolicited with reduce the amount it trusts the node that sent it.

EPOCH—Response of and Epoch
   Any node which asks for this will receive it
   Any node receiving this unsolicited with reduce the amount it trusts the node that sent it.

REGISTER_CHILD—Request to Register as a Child
   Any node receiving this will respond with one of the three below.
      REG_RESP_DENIED—Register Request DENIED—Sent if we don't trust a node or ping time is too long, or too many errors
      REG_RESP_NEXT_STEP Register request Next Step. Expect next request to be a REQ_CHILDREN If this node has >=MAX_CHILDREN active, it responds with this
      REG_RESP_APPROVED—Registration Approved—If a node gets a REGISTER CHILD from a valid, trusted or new node, and has <MAX_CHILDREN, it will respond with approved and add to the list of children One or more embodiment relating to a distributed computing platform will be described as follows. In Satoshi Nakamoto's whitepaper *Bitcoin: A Peer-to-Peer Electronic Cash System*, Satoshi discusses the concept of a transaction, in its simplest form being a source, destination and amount.

Such a transaction can be approximated by the creation of an object, which can be stored in a structure approximating Satoshi's.

If one were to expand the object concept from merely a data record or struct to that of a fully blown object, one is no longer storing simple, secure and Non-Repudiable data, but is storing full objects, with all their properties, methods and events.

Ethereum uses Solidity, a high-level Object-Oriented language designed to deliver smart contracts.

All of these systems, however, have a fundamental foundation in cryptocurrency.

This stems, in no small part from the fact that most successful blockchain solutions are funded and deliver value to investors and miners through the mining and trading of their specific cryptocurrency.

In their McKinsey & Company paper, Carson, Romanelli, Walsh and Zhumaev limit the scope of blockchain to some niche business applications, and given the current state of the art, their assessment is extremely accurate.

The present invention may differ in the following manner.

The initial scenario, the Switch, requires users to transmit secure data between parties who initially do not trust each other. This is performed over a blockchain by necessity of the scenario.

However existing blockchain technology does not provide the required speed of operation or utility. In addition, each blockchain has a different API and language.

Current State

The current state of this technology is reminiscent of early 1940s computing where computers were single purpose devices and scientists were planning general purpose computers (which took over two decades to become mainstream). Current blockchain solutions are limited to a few purposes and are not multipurpose, secure, distributed computing systems.

A Solution in the present invention following is provided as a non-limiting example. Our solution extrapolates from the single purpose blockchain, unlike the niche scenarios of Ethereum and Solidity into a fully compiled general purpose, secure distributed computing system.

Our solution leverages .Net, a rich and complete cross platform programming runtime, coupled with C#, a popular programming language used for all types of compute applications.

By using a true general purpose computing paradigm leveraging our blockchain, we are able to deliver a general purpose, compiled distributed computing platform.

How does it work?

1) Clients construct partial objects based on our defined GoObjects. These are constructed as C# source code by the clients.
2) All text, other than computer source codes such as C#, may be encrypted before transmission to a chosen compile element which compiles it using the Roslyn Compiler from Microsoft and the compiled object is returned as for example a base 64 encoded string. Said chosen compile element includes but is not limited to one or more of
a) API Server,
b) Client/User Device,
c) in process
d) out of process
e) Server
f) Serverless e.g. Azure Function
g) Hostless
h) a Github page
i) IOT
3) The Client submits this as a transaction to the blockchain
4) Recipients Execute the code and can run xUnit tests to validate the code.

Any code can be contained in the object under the proviso that it only uses the libraries we provide and that is passes all of our Unit Tests.

Unit tests are distributed with the node software and are executed as a part of the Node Validation process In one or more alternate embodiments the present invention uses a proof of stake[1] model to determine which Node shall write the next block (Founder Node) and the Blockchain system and method employed in arriving at said determination may include any combination of the methods and systems discussed or proposed elsewhere in this document under other headings and as follows.

One example of the way to determine which Nodes will determine the Founder Node is to for the Nodes (and/or their Peers) having a transaction and/or block to be written to the blockchain be the group that selects a candidate Node from among their peers or children to become the Founder Node which creates/writes the next Block.

Nodes select as their candidate Founder, the Node with the highest score CandidateScore calculated by an algorithm applied to each candidate and comprising one or more of the following elements representing the status or conditions of each of the candidate Nodes at that moment:—

1) Formulae to Select a Node to Write Next Block to the Blockchain

There are many formulae which will give a comparative result enabling selection of a Node to write the next block in a blockchain employing a Proof of Stake[5] method—

[5] https://en.wikipedia.org/wiki/Proof-of-stake

Indeed the present invention formula/procedure proposed as follows, will produce if not all then a large portion of the potential formulae that can enable arriving at a result directed to select a from among the candidate group the Founder or block writer Node with the highest score and most likely to have the highest level of trust and/or security and/or secure efficiency in blockchain operation thereby maintaining overall security of the blockchain and said formula could be expressed as follows:— a) An Algorithm or method to define an algorithm to calculate the numeric scores of Founder or blockwriter Node candidates such that the algorithm producing the numeric scores tends to produce high numeric scores for those Founder Node candidates most likely to have or produce the highest trust and/or efficiency and/or security in conducting the operations of a blockchain i) Is derived by the following (Node MetricsMax element or elements, or any of them, singularly or in any grouping added together and/or multiplied together or multiplied by or added to some other number and/or raised to a power greater than 1).

Divided by (NodeMetricsMin element or elements, or any of them, singularly or in any grouping added together and/or multiplied together or multiplied by or added to some other number and/or raised to a power greater than 1)

ii) The elements which comprise NodeMetricsMax and NodeMetricsMin are defined as follows NodeMetricsMax Describes, in this instance, measurable criteria or elements of a candidate Node whereby the higher the numerical value of the criteria the higher the desirable tendency to trust and security and more likely that the candidate node possessing high levels of such criteria will achieve selection. These NodeMetricsMax include but are not limited to those expressed below at 2) a., b. c. & e. but only including e. if it is a positive number.

NodeMetricsMin Describes, in this instance, the measurable criteria or elements of a candidate Node whereby the lower the numerical value the higher the tendency to enhancement of trust and/or security and/or efficient operations of the blockchain which is desirable and more likely that the candidate node possessing such low numerical criteria will achieve selection. Such NodeMetricsMin Include but is not limited to that expressed below at 2) d. & e. but only including e. if e. is a negative number AND value e. is to be used without reference to its negative value as an absolute value.

b) In addition to the calculation of a score for candidate nodes, proposed voting methods include:

i) factoring in the number of coins/tokens owned by the addresses associated with the Node by manipulation of the score, obtained by methods system(s) described at 1) through 1) a) ii) above, with any operator producing a positive or incremental result e.g. multiply or add.

ii) a special case ensuring number of Tokens owned by a User/Client associated with a particular Node cannot elevate a candidate node to founder node status unless said candidate node has a trust score of Zero or more OR eliminating from candidate status any node which has less than Zero trust score.

and iii) Founder Nodes candidates will become a founder if they assess that they have more than 50% of the vote. They do this by assuming that other branches of Parent, Peers and Child Nodes are similar and would vote in a similar way.

2) Nodes select as their candidate Founder in the present non limiting example from amongst the group comprising Parent, Peers and Child Nodes, the Node with the highest score calculated by an algorithm applied to each candidate and comprising one or more of the following elements representing the status or conditions of each of the candidate Nodes, or in the case of CandidatePingTime each of the candidate nodes in relation to the voting node establishing CandidatePingTime, at that moment:— a. CandidatePeers=Number of active Peers of a Founder candidate Node. A Node with a large number of peers is preferable being therefore more exposed to being rated on Trust by its peers.

b. CandidateBlocks=The Length of the current blockchain held by a Founder candidate Node. It is always preferable to be working with or on the longest blockchain C. CandidateUpTime: once a node sees another node, it starts a timer, communicates with it as things occur and thus internally persist its uptime, therefore the measured time is from when we see and accept it as a node in our hierarchy (parent, child or peer). The larger the CandidateUpTime the more exposure time the Node has to being rated for trust by its peers. Longer up time is good for trust and blockchain security The way this works is once we see a node, we start a timer. We communicate with it as things occur and thus internally persist its uptime, therefore the measured time is from when we see and accept it as a node in the hierarchy (parent, child or peer)

d. CandidatePingTime=Ping time of a Founder Node candidate as seen by each voting node: Ping time is the elapsed time from the sending of a Ping or message to one or more nodes until the receipt of a response to the Ping. Ping Time being an approximation of the separation gap or distance and/or communication conditions presently experienced in communication between the sender of a Ping to one or more Nodes and the corresponding response to the sender of the Ping from each of the Nodes receiving a Ping. Short Ping times are preferable for many reasons not the least of which is to minimise possible impact of network problems or conditions on the timely writing or execution of transactions. The Ping time is altered by network conditions and technical performance of both sending and receiving nodes, which can introduce non-pseudo randomness into the values available to calculate scores for Founder Candidate selection.

e. NodeTrust: is an accumulating value in this example—a field value which has a starting value=0 and which accumulates i) Positive trust points as contemplated in NOTE2 below.

ii) Negative "exclusion" points issued by its Peer Nodes for contrary or "bad actor" actions thereafter up to −10 points before some disciplinary action such as exclusion of a node from activity on the blockchain.

Contrary actions by a node earning it exclusion Points including but not limited to "bad actor" conduct or incongruent actions by said Node could include but is not limited to (1) sending one or more unsolicited messages which normally must first be requested.

(2) Sending the same message twice.

(3) Sending a transaction that involves spending of tokens previously spent (4) Sending an invalid transaction, block or blockchain (5) Not responding to a request from its Peers iii) NOTE1: NodeTrust and negative exclusion points do not normally persist after a Node is shut down but in yet another preferred application of present invention Node details, Address details (addresses of clients, IP providers, and blockchains) associated with the Node and Trust score exclusion points details may be stored in the blockchain or output to Database or other storage for later review and pattern detection in events reducing NodeTrust.

iv) NOTE2 in yet another application of the present invention the concept of awarding positive trust points for good actor performance may be applied as appropriate for example in providing say 0.1 points for one or more of Positive Actions collectively being responses to or messages to, or interactions with, a peer whereby one or more of said Positive Actions is not on the exclusion list at e. i) 1) to 5) above. In this way a Node that has long up time and no bad actor actions may accumulate a NodeTrust score of more than zero. It may be useful to consider limiting the upper boundary of the positive NodeTrust score absolutely and/or incrementally for example by reducing the points earned by a factor of 10 at each incremental positive whole number of NodeTrust score e.g.

| For NodeTrust | points earned per Positive Action |
|---|---|
| > or = 0 & <1.0 | =0.1 |
| > or = 1.0 & <2.0 | =0.01 |
| > or = 2.0 & <3.0 | =0.001 |

Such limiting as proposed above together with say an upper absolute bound of score=3.0 NodeTrust, can ensure that a small number of bad actor events have a significant and immediate effect on NodeTrust scores.

Example 1: Where NodeTrust is Negative −2

Max: CandidateUptime seconds 50

/divided by

Min: CandidatePingTime seconds 0.003+NodeTrust (number): −2 and because NoteTrust is a negative number it is included in NodeMetricsMin and we remove the negative sign and take the absolute value of 2. Formula 50/0.003+2

50/2.003

CandidateScore 24.96255

Example 2: Where NodeTrust is Positive 2 Include NodeTrust in NodeMetricsMax

NodeMetricsMax: CandidateUptime seconds 50+NodeTrust (number): 2

/divided by NodeMetricsMin: CandidatePingTime seconds 0.003

Formula 50+2/0.003

=52/0.003

CandidateScore=17,333.33

As can be seen from the preceding examples the present invention algorithm a positive NodeTrust value makes a substantial increase in CandidateScore assisting in selecting trusted Nodes to write the next block in a blockchain and tending to exclude Nodes with low or negative NodeTrust values.

The following describes one or more other embodiments of the present invention.

Bulk Update of Financial Details

Computer software or operating code such as a decentralized application (DApp) provides for a configurable format of message to be sent with high security as an encrypted blockchain transaction directly by a customer from a secure blockchain storage record containing a customers new financial or other details, initiated via a mobile or other device having a fully participating blockchain node operating in a Web Assembly[26] instance in a modern web browser within said mobile or other user device and said message is sent through a blockchain transaction to one or more of Merchants or financial providers (Merchant or Merchants) in differing encrypted form to each of said Merchants such that the message may be de-crypted only by the recipient Merchants and the message having been formatted to easily be passed into or mesh (mesh) with any legacy software systems for each Merchant, the de-crypted message details may be processed automatically without the usual human intervention normally required by Merchants, to validate the customer identity and then update Card or financial Ac or any details of the customer held by the Merchant.

[6] https://webasseirsbiy.orq/

The present embodiment of the invention software application D'App provides a combination of the following:—

1) a secure blockchain storage record of one or more customers financial or other details,
2) a secure blockchain storage record of one or more Merchants financial or other details including the required format for customer financial details to mesh precisely with each of said merchant/providers legacy software systems record of customer financial details.
3) a mobile or other device operating a fully participating blockchain node in a modern web browser,
4) Private and Public keys held by one or more Customers and Merchants/financial service providers such that a message, between a particular customer and one or more particular merchants/providers, may be:—a) encrypted using Recipients Public Key and
b) signed with Customers Private Key and validated before sending to one or more Merchants in a format particular to the Legacy computer software systems of each of said one or more Merchants and
c) Upon receipt by the Node associated with the Merchant is validated as being from the particular Customer and de-crypted using the Private Key of the recipient Merchant and d) the message being formatted to mesh with any legacy software systems for each merchant/provider,
e) the de-crypted message details may be processed automatically without the usual human intervention normally required to validate the customer identity and then updating said Card or financial Ac or other details of the customer held by the Merchant/provider
f) In yet another embodiment of the present invention the practice of sending by un-secure email systems sensitive information such as invoices and statements revealing Client and Merchant details may be abolished by Merchants relying on the present invention highly secure blockchain and/or DApp to be the most secure path for transmission to Clients. The abolition of emails from Merchants to clients with sensitive data will much reduce scope for fraudulent activity and provide opportunity for reduced costs incurred through fraudulent activity.

One or more embodiments of the invention provides for a method and system for conveniently and securely storing such critical data as the Private keys necessary to conduct transactions on a Blockchain or distributed ledger system.

There have been many examples of loss of assets by families and corporations suffering the loss of a corporate functionary or loved family member who dies unexpectedly holding private keys necessary to access or claim or use assets held in contracts or crypto-currencies on a blockchain.

Examples of this problem abound e.g. the Death of Gerald Cotton, CEO of Quadriga CX dies without leaving access to passwords he controlled for access to approximately $US 190 Million of corporate crypto-currency assets (https://www.news.com.au/finance/money/costs/quadriga-cx-customers-demand-answers-after-founders-death/news-story/ea0c522e3d0e49e5accl30998a3f5bc6) AND Matthew Mellon who dies leaving his family unable to access some 500 million of crypto currency assets believed owned by him (https://www.cryptoground.com/a/matthew-mellon-death-500-million-cryptocurrencies-lost-forever).

The present invention system and method provides;

1) simple, convenient, ubiquitous and highly secure means for users, especially unskilled users, to manage their access to Apps controlling valuable assets or information (User Owner or Owners), including Apps accessing blockchains whereby said blockchains require Public and or Private keys to access said Apps and the assets or valuable information which may be controlled or accessed by said Apps (Other App or Other Apps). Additional software or application software (Appl) is provided which controls access to said Other Apps and said Appl provides for a prudent User Owner to appoint one or more and preferably several persons or entities (Trust or Trusted Group) so that in circumstances whereby said User Owner is incapable of acting to access said Appl and Other Apps, said Trust Group members or any one or more of them may, on terms specified by said Owner User, gain access to said Appl and the Other Apps controlled by said Appl. The present invention thereby having the advantageous aspect of providing that valuable assets and information shall not be lost or timely access means can be provided to said valuable assets and information in the event of incapacity of an Owner User the present invention software and said Appl software employing the following method; record or employ a method of encrypting and recording, sensitive information such as the private keys necessary to access crypto-currencies or other assets held in various electronic storage means and accessible only by entry of said private keys;

said Appl employing the following method—

2) Set up of Appl a) To allocate or provide User Id's in Appl to individuals and obtain from individuals or entities comprising said Trusted Group i) individuals names and details (Name Id) and ii) a password for each individual or entity and iii) biometric data including but not limited to video and or static images of the individuals or entities comprising said trusted group of relatives friends of the User or in the case of corporate Users other officers of the corporation (Trust Group). Said biometric data being obtained from known means and/or created with a mobile phone or other device having electronic camera capability or other device (Biometric Data Capture), b) and store electronically, image or images or other recording means of one or more of biometric characteristics of the User and the Trust Group and where appropriate recording of motion and said Biometric Data Capture stored so that said store of data relating to each individual may be accessed separately (Biometric Data Storage)

c) and said recording including but not limited to a person's characteristics including but not limited to fingerprints, facial, retinal, DNA (Biometric Data).

d) Said Trust Group preferably comprising more than 1 person and less than 20 and in the present non-limiting example 4 persons. Said Biometric Data or some of it is stored in more than one location and in the present invention example in 2 locations as follows;

i) firstly, in other storage on a mobile phone or other User device including storage such as personal or corporate cloud storage and/or in a database accessible by the User from more than one of devices available to the User (Biometric Data Storage 1).

ii) secondly in a transaction in a secure blockchain (Biometric Data Storage 2) said blockchain or other blockchain may also contain or record access means to valuable Financial property of the User or containing keys or other means to access said valuable Financial property or access other software programs (Other Apps) that a User may desire to access and said Other Apps being protected by passwords or other security means including verification of User Owners incapacity by official documentation such as death certificates or verification of powers of attorney (Other App Access Protocols) and e) Said Trust Group in the case of corporate Users whereby the corporation has many employees all requiring individual and/or departmental corporate blockchain addresses. Addresses used in the Blockchain may include more than simply a user's address. For example, a two part or second address identifier with one part or address identifying a particular blockchain or distributed ledger system and a second part or address is the user address and said addresses or either of their parts identify the processing or actions needed by the system.

g) However, in the case of corporate and other users of blockchains it may be useful or indeed necessary to expand the concept of addresses to incorporate additional addresses or address parts including but not limited to addresses identifiers for functionaries positions, departments, groups, personal authorities added to a transaction etc at various levels in an organisation. By such means for example all authorities applied to transactions by a certain person may be simply identified by searching for transactions containing the relevant personal authority address rather than the personal address which would likely require much more analysis of a potentially larger cohort of transactions and each of said larger cohort of transactions would need scrutiny to determine if the person had specifically applied their authority to a transaction.

h) The concept expressed in this point and e) and f) preceding this point refers generally to blockchains or distributed ledgers. Said additional blockchain addresses or address parts relating to one or more transactions are necessary for the proper functioning of businesses or other multi-entity/person enterprises employing efficient blockchain business/enterprise solutions, in some instances, a further identifier or code as to type of transaction to assist in efficient handling and providing of efficient solutions to various processes.

Said additional blockchain addresses or address parts may be incorporated into an app module computer software or function whereby a hierarchy of addresses and or additional addresses or address parts forms a relational hierarchy with approval needs and authorities attributed to certain addresses or address parts. In one view, this is similar to a corporate management hierarchy tree having blockchain addresses which included identifying not only the person or position but the department and the individuals and the authorities to approve certain transaction types.

For example when a corporation requires more than one person to approve of a transaction type 1, or access certain existing transaction data said app module could display to a manager to view the transaction prepared by said managers assistant who is authorised for transaction type 1, and require said Manager to add or signify approval whereupon said transaction is updated to include the/address parts and authorities applied by the entities involved in the transaction and then all recorded in one or more transactions in one or more blockchains.

The concept expressed in point g) above is not limited the concept of Trust Groups and secure storage and access to resources but refers generally to blockchain or distributed ledgers and systems and methods relating to combinations of blockchains and databases.

3) Said App 1 also manages a list of Other Apps and a) stores in a blockchain the related User information or Other App Data and any Access Protocols necessary to access and use said Other Apps including one or more of but not limited to; b) information relating to Commercial Id Auth providers such as but not limited to Google, Microsoft and Facebook;

c) private keys and Public keys and any relevant details thereof relating to any User on any of Other Apps including Apps accessing blockchains.

d) Other App website URL's;

e) Other App Passwords;

f Other App security challenges and answers;

g) Other App secret questions/answers for password recovery and 2)a) to 2) g) collectively referred to as (Other Apps Information].)

4) Preparatory to an attempt to launch an Other App, Appl requires the intending User (Current User) to submit their name or Name Id, and password established at step 1. above for checking against a list of Users (Namecheck) and 5) if Namecheck valid conduct current Biometric Data Capture of the Current User (Biometric Data Current) and thereafter enable comparison of biometric data and compare Biometric Data Current with Biometric Data Storage 1. Alternatively the password step may be omitted and instead rely on Biometric Data Current comparison with Biometric Data Storage 1 in the interests of simplifying the procedure; 6) If said comparison at the preceding step above is accepted by Appl as a match then said Appl recovers from Biometric Data Storage in a blockchain the Biometric Data Storage 2 and compares said Biometric Data Storage 2 to Biometric Data Current 7) If said comparison at preceding step is a valid match then Appl shall a) display a list of choices to the user to Launch Other Apps.

b) Choices may include selection of an Id or Identity associated with the User when using the said Other App and upon User selection of 7) a) or b) Appl will further do one or more of the following:—

8) Retrieve from the blockchain the selected Other Apps Information and

9) Preferably pass the relevant Other Apps Information such as addresses passwords Public and Private keys to the selected Other App as necessary for the User to seamlessly gain access to and participate in the said Other App or provide said Other App Information conveniently accessible for the User to select and use with a minimum of keystrokes and time expended to gain access.

10) Launch the selected one of Other Apps

11) The purpose and conduct of the Trust Group provided by Appl and referred to at 1) above is to provide back up access to the assets and information in accounts (User Accounts) set-up by a User Owner, User 50 in this non-limiting example and said User 50 who for whatever reason has become unable to personally access said User Accounts.

a) When setting up the Trusted Group User 50 may specify how access is to occur.

b) For example, the personal User may specify that a majority of the Trust Group may appoint one of their number to be authorized as User.

c) In the case of a corporate User the corporation may determine that any of the Trust Group may be authorized at any time to have access.

d) Appl may optionally keep a log of access events but need not have access to any other information.

12) The foregoing invention may advantageously employ the use of a special type of blockchain or distributed ledger system whereby the software to run or operate a fully participating ephemeral node in the distributed Ledger or blockchain is able to operate in a modern web-browser running Web Assembly, said browsers including but not limited to web browsers such as Internet Explorer, Google Chrome, Mozilla firefox and Safari, running on physical and virtual devices which for example may include a Mobile Phone, a Tablet, a PC or personal computer, a Server, IOT^ device or a virtual machine running in, and/or connected to, the Cloud AND/OR said distributed ledger system software enables transaction message payload stored in the blockchain to be executable code comprising dot Net Standard compliant code including C# (C sharp) programming language said executable code contained in said blockchain or some of said code may also consist of code to run said Appl. within said web browser instance.

One or more other embodiments may comprise computer software or operating code such as a de centralized application (App) provides for a configurable format of message to be sent with high security as an encrypted blockchain transaction directly by a customer from a secure blockchain storage record containing a customers new financial or other details, initiated via a mobile or other device having a fully participating blockchain node operating in a Web Assembly instance in a modern web browser within said mobile or other user device and said message is sent through a blockchain transaction addressed to one or more of Merchants or financial providers (Merchant or Merchants) in differing encrypted form to each of said Merchants such that the message may be de-crypted only by each of the recipient Merchant using their individual Private keys and the message having been formatted to easily be passed into or mesh (mesh) with any legacy software systems for each Merchant, the de-crypted message details may be processed automatically without the usual human intervention normally required by Merchants, to validate the customer identity and then update Card or financial Ac or any details of the customer held by the Merchant.

The present embodiment of the invention software application and App provides a system and method comprising the following:—

1) a secure blockchain storage record of one or more customers financial and/or other details including credit card details and/or Bank periodic payment details and/or a code that is agreed between the customer and Merchant as being the identifier verifying the source of any communication between said customer and said Merchant (IdCode), Establishment of said IdCode may also be performed separately from the present invention by other means including use of 2 factor authorization including the use of biometric identification including facial recognition and fingerprint recognition means available through many modern mobile telephones.

2) a secure blockchain storage record of one or more Merchants financial/bank Ac or other details including the required format for customer financial details to mesh precisely with each of said merchant/providers legacy software systems record of customer financial and/or other details.

3) The App then does one or more of loading the Client Card details and the Clients Id No or Account number, or other agreed secret codeword that Client and Merchant have established as a Means of positively identifying the sender and/or receiver of messages between Client and Merchant 4) a mobile or other device operating a fully participating blockchain node in a modern web browser and or 5) a blockchain operating such that transaction payload messages are always stored in the blockchain as executable code, which may be executed by modern browsers (using WebAssembly)—Transactions may be dot Net Standard compliant software.

6) Private and Public keys held by one or more Customers and Merchants/financial service providers such that a message, sent by a particular customer to one or more particular merchants/providers, may be:—a) encrypted using the Public Key of each recipient in this example/case one or more Merchants b) signed with Senders Private Key and validated before sending to said one or more Merchants. Said message may first be made in a format particular to the Legacy computer software systems of each of said one or more Merchants or a separate data transposing function is provided to Merchants to transpose the data into said legacy software system of said Merchant upon receipt of said message/data by said Merchant and i) Upon receipt by the Node associated with the Merchant said message is validated as being from the particular Customer and de-crypted using the Private Key of the recipient Merchant and ii) If the message is formatted to mesh with any legacy software systems for each recipient merchant/provider or a data transposing module is provided to said Merchant to transpose the data into said legacy system, then said legacy systems may be updated immediately without human intervention.

c) the de-crypted message details may be processed automatically without the usual human intervention normally required to validate the customer identity and then updating said Card or financial Ac or other details of the customer held by the Merchant/provider.

7) In situations where any Merchant/Supplier has not yet joined or subscribed to the system (UnSubMerchant) the system or application provides means to enable a Customer register as a customer of an UnSubMerchant and said Customer to provide or enter into the Application one or more identifying details of the UnSubMerchant a) such as address and/or
b) telephone number/or
c) registered business number
d) or Facebook address or
e) Linked in address obtained by Customer or by the app querying or searching addresses via internet query and having obtained addresses of the UnSubMerchant the application then provides for the Customer f) sending of one or more messages to said UnSubMerchant address or addresses such as i) Facebook or
ii) email or
iii) SMS or
iv) WhatsApp or
v) Telegram to alert said UnSubMerchant that their Customer wants the UnSubMerchant to subscribe so as to receive or be ready to receive securely new card or other details such as home address or change of subscriber plan of services provided to customer by UnSubMerchant.

By this means Customers awaiting Merchants to subscribe (CAMS) have some satisfaction in there being a process to alert their UnSubMerchants and by the accretion of numbers of CAMS messages on social media provide a "viral" pressure on UnSubMerchants to subscribe to the Application.

8) Security in onboarding Candidate Merchants into the Application to take ownership of a particular UnSubMerchant identity (CM). The Application includes one or more methods of verifying a Merchant who purports to be a particular UnSubMerchant presenting to the Application to take ownership of the Merchant Identity on the system and thereby becoming in the first instance a candidate Merchant or CM.

Said verifying method utilizing pieces of verifiable shared information (VSI) which only the true CM would be expected to possess—e.g. the Customers email address that the Customer used to open their account with CM or the account number established with the CM or a recent transaction ID or a secret question/answer that may be established between the Customer and the CM and the app employs this VSI verification of CM's bona-fides e.g.

a) Having the customer requesting the CM to send a message containing one or more VSI items to a Customer via the Application
b) said Customer examines the VSI in the message and signifies said VSI is correct or incorrect c) Upon the customer signifying that he has completed examining the VSI, the Application sends a message of said customer examination success or failure to
i) the CM noting VSI as correct or incorrect
(1) if incorrect the CM could again check the VSI and correct and send an updated message for review again.
ii) an App maintained VSI address or location identifiable/linked to the particular CM identity so that:—
(1) The application may then upon reaching a prescribed number of
(a) successful VSI messages send a message to said CM and uplift status of CM to a confirmed Merchant and also notify all pending CAMS of said success
(b) unsuccessful VSI messages, notify the CM of this and invoke a process of human intervention to assess the bona-fides or otherwise directly with the CM One or more other embodiments may comprise Financial account providers, such as credit card companies, merchants, lenders, banks etc., offer methods for customers to switch their financial instrument/activity from an existing provider to a new provider. Typically, such methods are time consuming and/or lack the high levels of security which should attach to transmission of such sensitive information from customer to Merchant/financial service provider and there is no written evidence of such switch easily accessible to both customer and merchant/financial provider. Attempts have been made to improve various aspects of this process including the use of Blockchains.

Perennial problems exist in prior art in software systems deploying blockchain technology including; extended time to execute and complexity of systems necessary to conduct, handle and validate blockchain transactions; the failure to maximise security conditions in many implementations of blockchain systems because increasing security tends to create overly complex implementations.

According to the Harvard Business Review (https://hbr.org/2017/03/how-safe-are-blockchains-it-depends), blockchains can only be safe if they are operated correctly, including providing multiple operational nodes of the blockchain. Satoshi Nakamoto in the original Bitcoin whitepaper published in October 2008 (https://bitcoin.org/bitcoin.pdf) stated in words to the effect that "a blockchain would be secure as long as there was more computing power operating for vs against the network". A typical architecture for a system deploying blockchain would be a server-based API communicating with a Single Page application refer Microsoft Magazine (https://msdn.microsoft.com/en-us/magazine/dn463786.aspx?f=255&iy|SPPError=–2147217396). This would provide good functionality however the server API infrastructure is a potential security weak point.

Technical discussions on the general subject and touching areas traversed by the present invention reveal no technologies/solutions of the present invention. Following are references to leading technical experts in the field and their deliberations may be reviewed in the reports and recordings of meetings discussions in many reports similar to the following and stored at the same resource (https://github.com/ethereum/pm/blob/master/

AII%20Core%20Devs%20Meetings/Meeting %2039.md https://www.youtube.com/watch?v=7FNRWEQ H7w).

There are also reports from other leading or technicians and groups but again no evidence anticipating the present invention.

For systems deploying one or more blockchains as part of the system architecture elements, security requires as many nodes as can be conveniently created and made active, but increasing numbers of active nodes increases complexity and decreases ease of use, development and maintenance. On the other hand, optimum conditions for conducting development, operations and maintenance benefit from simplicity of system architecture. Until the present invention these key factors 1) Simplicity in development, operating and maintaining compete against 2) security often causing compromise resulting in less than optimum outcomes in both 1) and 2).

Communications between parties related by commercial or other transactional links or storage of personal information hereinafter referred to as (Related Parties) and protection of the transactional data and release thereof or discussion about such transactions or release of related personal information hereinafter referred to as (Customer Data Release) require one or more of the parties involved in said transactions to observe at least a reasonable level of privacy rules that are either self-imposed rules or industry standards or standards imposed or strongly recommended by government agencies to ensure that Customer Data Release only occurs between the Related Parties or their duly authorised representatives. The rigor in ensuring privacy rules that are observed in Customer Data Release often requires onerous layers of privacy and related identification procedures which consume valuable resources. The present invention offers a simple and secure alternative.

Any discussion of the prior art in this specification should in no way be considered as an admission that such prior art is widely known or forms part of common general knowledge in the field unless so specifically stated herein.

Improved computer system architecture supporting simpler and more secure blockchain systems together with systems and methods for developing efficient and secure blockchain based business solutions including provision of secure data, messaging, voice and video communication by enabling a Web RTC network between nodes and optional recording thereof, between two or more web instances of an Application (APP) containing or connected to a synchronously operating fully operational blockchain node. A detailed explanation of the communications implementation in the present invention blockchain system follows:—

1. WebRTC is a free, open project that provides browsers and mobile applications with Real-Time Communications (RTC) capabilities via simple APIs. The WebRTC components have been optimized to best serve this purpose.
2. The WebRTC initiative is a project supported by Google, Mozilla and Opera, amongst others.
3. Nodes in a blockchain need to communicate with each other (Satoshi Nagamoto et al)
4. Traditional (Legacy) nodes can communicate over the internet using WebSockets (a traditional way for Internet Hosts to communicate (https://en.wikipedia.org/wiki/WebSocket))
5. Modern Nodes cannot as they are commonly behind a dynamic NAT (https://en.wikipedia.org/wiki/Network address translation) or two
6. The present invention leverages a combination of WebRTC for Communication (https://webrtc.org/) and PeerJS (https://peerjs.com/) and deliver our own PEERSERVER which delivers the equivalent of websocket comms over WebRTC.
7. Our only system of Node-to-node communication is WebRTC and our nodes run under WASM (https://webassembly.org/) in the browser sandbox.
8. So, we can describe the present communications novelty as follows:

Leveraging PeerJS over WebRTC to allow Nodes running under WASM to communicate across single, multiple or dynamic NAT environment is a novel application of the technologies and provides an effective way for our blockchain system nodes to communicate across modern internet connectivity paradigms bi-directionally.

A system of computer software and devices configured so as to enable a simple and more secure blockchain transaction whereby a customer of a Merchant/financial provider may use a computer software application (App2), to send an encrypted message containing, for example, new credit or debit card details or a new bank Ac to debit periodic regular subscriptions or other regular payment obligations (Card Details), said system configuration comprising at least; persistent or ephemeral fully operational blockchain nodes. Each of said nodes are able to communicate using WebRTC via an application or server (PeerServer) which provides Id's for the nodes, with others of nodes and/or via App2 database storage. Said nodes may also create and write transactions to a blockchain or distributed ledger and/or a Database and said nodes hereinafter referred to a Node or Nodes;

a blockchain may be constructed so that the data is written in a code which is then compiled and then encrypted before being written to a blockchain and/or database;

at least one client and one Merchant mobile or other device including lap tops, tablets, PC's or any device capable of running a web instance of an App2 running in a Web Assembly or WASM construct/instance and containing or connected to a synchronously operating fully operational Node, a communication link and or means including Web RTC protocol for transmitting secure data, messaging, voice and video both ways between web instances of an Application (APP) containing or connected to a synchronously operating fully operational blockchain node whereby for example; a MerchantA may recover from storage in the blockchain the public keys PU1 of their CustomerB and PR1 MerchantA's private key and use the said public key PU1 of CustomerB to encrypt a message to the said CustomerB and sign the said message with MerchantA's private key PR1; said message may include any document or digital representation e.g. invoices, notices, promotional data or images/videos and any text message may include an invitation to initiate a voice or video call between any blockchain address of the sender or author (Sender Address) whereby said sender address is known to the recipient (in this example Merchant) Merchant;

any User Customer or Merchant will upon opening the App be alerted to and/or presented with any messages; the App will 1) only receive a message from another valid node address-addressed to the recipient node unique node address and decrypt/display a message if it matches with the unique Customer/User address being the valid recipient having the correct private key corresponding to public key PK1; 2) PK1validate the message as coming from MerchantA by recovering from the blockchain the public key of MerchantA and checking it is a pair i.e. corresponds with the private key the Merchant used to sign the message; 3) handle/perform all/encryption/de-cryption and validations, without Customer/Merchant intervention using public keys stored in the blockchain for the relevant parties Merchant A and CustomerB;

An invitation from MerchantA to CustomerB to call said MerchantA or vice versa can include an activation means for CustomerB to immediately initiate Peer to Peer voice or video call to said MerchantA. Said voice or video call may also be encrypted in a similar manner to a message and all communications may be recorded in the blockchain as a permanent record of the message/call/transaction;

Communication between peers on User devices is facilitated across Network Address Translators by the provision of a node signalling server or service which works as follows;

as a node is launched it broadcasts a signal, or has a static address(es) to one or more node servers or Peer Servers (Peer Server or Servers); said signals may be structured to contain the identity (ID) of the blockchain and or the Id of the Peer Server and/or the address of the node issued previously by the Peer Server and/or a User Id, and said signal is either a request for a list of active Nodes on the blockchain and/or allocation of an address the Node said address including a WEBTRC address; Nodes on a particular blockchain may communicate in one or more of the following modes-broadcast peer to peer using node communication language (NCL) to one or more of a Node's peers or all active nodes/addresses for said particular blockchain on the Peer Server; send messages between a particular user and one or more of known addresses on said blockchain and in this example a Merchant with whom the user has a commercial/social relationship. As some or all nodes are ephemeral a procedure may exist such that if a node, registered as active on the Peer Server or service, does not respond to broadcasts its status is downgraded and it can be removed from an active node list maintained by the Peer Server and or maintained by each active node; said Peer Server may also serve as a master Peer Server or register nodes for more than one App and or more than one blockchain so that one or more Users in one App or blockchain may have User node addresses in other blockchains thereby enabling for example UserA to complete a financial transaction in one blockchain, say Fin App on FINblockchain and then skip to another blockchain by selecting the desired target blockchain, e.g. Social blockchain or Games blockchain and broadcasting the Users corresponding node address in the desired target App or blockchain or sending to the Peer Server the Users corresponding node address in the desired target blockchain and be validated as a User on, and begin participating in, the target App or blockchain;

said node signalling server or service may also manage nodes and or addresses and/or User Id's for more than one blockchain and can display/provide to Users of all blockchains it manages a menu or list of available Apps and blockchains and if a User selects an App or blockchain but does not possess an existing node address for that particular App or Blockchain then the Peer Server may provide an address or link so that the user may go to the "join up" site for the selected App or blockchain; said node signalling server or service is typically located in a cloud computing service.

If the Merchant and Customer on a blockchain want higher level security for certain operations then the Merchant Customer could create an additional verification step using one or more of biometric fingerprint/facial/retinal/DNA verifications (Biometric Verification) compared with records (including as may be necessary or desirable official documents such as passports) held in the user device and/or in the blockchain; higher level security means may also be employed as part of a Passwords and key storage service whereby passwords and important information may be stored in a blockchain and be accessible only to the user by satisfying the Biometric Verification key to access stored passwords or other keys e.g. for cryptocurrency addresses; a protocol for such recovery of information from a storage service could include the recovery after death of a User by the use of DNA and/or a registered will and/or probate thereof or other acceptable legal means of establishing possession of a Users estate;

One or more other embodiments may comprise a third-generation distributed compute platform (The Unblocked Platform), providing general purpose computing coupled with a ledger. Mass adoption of distributed ledger technology is being limited by scale issues with the core technology. Limited by the complexity of the implementation of the technology.

Lastly, limited by the difficulty for developers to adopt and use the technology. These drawbacks have meant that the advantages of a secure, open and immutable distributed ledgers are often not being selected for projects where it would seem very appropriate or valuable.

Some embodiments comprise a distributed computer platform, providing general purpose computing coupled with a ledger comprising;

a) A software construct or platform to process a developers C# and or .Net application code and create and compile and deliver to said developer an application designed to run in a modern web browser, said application having a distributed ledger or blockchain and for each user a corresponding indexed database dedicated for sole use by User related needs including application said application and associated Node needs.

b) an indexed Database and a blockchain node located on any device capable of running a modern web browser, said indexed Database capable of communicating Database transactions to other software which translates or manipulates each database transaction into a form suitable to be received and processed as a blockchain or distributed ledger transaction by said blockchain node;

c) Each application created on the platform software to has a unique ledger identifier GUID and is part of the Platform's ecosystem, enabling communication between ledgers. d) applications created on or by the platform may also run on large scale devices or Servers or cloud-provided scalable compute or traditionally in existing datacentres.

e) Large scale devices running applications created on or by the platform may run using headless chrome instead of a web browser.

Some embodiments comprise a system or application running in a web-browser in a user device to distribute database transactions to a corresponding node in said application in a form suitable for creation of a blockchain transaction and transmit said transactions securely across a peer-to-peer network as corresponding blockchain or distributed ledger transactions.

While each application instance runs a node, the local database only holds transaction data that are relevant to the system, application or user.

The Unblocked Platform offers a solution to these drawbacks, allowing developers to focus on delivering world-class users experiences, with unbridled user performance, all with the simplicity and accessibility of a web page.

Convergence

While Satoshi Nakamoto's development of Bitcoin in 2009 was the introduction of Cryptocurrency; and Ethereum's development delivered a Turing-complete programming environment, the Unblocked Platform delivers a general-purpose computing environment, coupled with the benefits of a distributed ledger.

The Unblocked Platform leverages several technology trends:

WebAssembly—is a stack machine, embedded in every major internet browser allowing developers to compile software to a binary format which executes at near-native speed, by taking advantage of the hardware available on a wide range of platforms. More information on WebAssembly can be found here: https://webassembly.org.

Proof of Stake—most current distributed ledger technologies identify the node that writes a block by using a mechanism called proof of work. In short, nodes attempt to solve a complex cryptographic puzzle and the first to solve it writes a block. The primary purpose of this is to find a node at random to write the block, increasing the security of the network. Proof of stake (PoS) is an algorithm by which a blockchain network aims to achieve distributed consensus. In PoS-based blockchain networks, the creator of the next block becomes allocated via various combinations of random selection and wealth or age (i.e., the stake). In this platform, the creator of the next block is chosen using an agreed algorithm based on network proximity, reliability and uptime.

IndexedDB—IndexedDB is a large scale, NoSQL storage system which allows the storage of significant amounts of data coupled with transaction management and high speed read and write. The platform uses IndexedDB to store information relevant to the platform, nodes, and running local networks.

Fast local and mobile networks—in a distributed ledger, the ability to communicate between peers is paramount. While it is challenging to allow end-user devices to communicate directly, our use of Session Traversal of UDP through NAT (STUN) and Traversal Using Relays around NAT (TURN) servers allows us to use WebRTC to communicate data between nodes, irrespective of their network topology.

WebRTC—Web Real-Time Communication (RTC), is a free, open-source project that provides web browsers and mobile applications with real-time communication via simple application programming interfaces. It allows audio and video direct peer-to-peer communication to work inside web pages, eliminating the need to install plugins or download native apps.

Smartphones—With billions of smartphones running modern internet browsers, this provides the necessary device ecosystem suited for this type of Platform and means we can reach and secure our environment across a significant proportion of the planet's population. About the platform:

The Unblocked Platform has been designed to allow rapid creation of database-style applications, without need for a central database or API layer.

At its core, Unblocked offers a user interface and computing environment with a database backend coupled with a distributed ledger. It is providing tremendous benefits by leveraging both database and ledger technology, allowing rapid local performance, while securely distributing data and information between clients.

Unblocked utilises Blazor, a technology from Microsoft which allows for rapid development of Single Page Applications (SPA's) without resorting to common JavaScript frameworks https://dotnet.microsoft.com/apps/aspnet/web-apps/client.

Using Microsoft dotnet and C#, developers rapidly create a well-structured and managed application on the Platform, and a faster, more secure environment for users to operate.

The client-side application is served from a flat file web server, which can be anything up to and including GitHub, Amazon Web Services, Google Cloud or Microsoft Azure.

Applications can run directly from a device when packaged and published into existing ecosystems, such as Apple's App Store, Google's Play or Microsoft's Store using new application frameworks such as Electron https://electronis.org.

So, with ease, users simply access Unblocked applications by either clicking an URL in the browser or launching an application from the app store.

Applications perform their tasks (Create, Retrieve, Update and Delete) against IndexedDB. Applications perform this using the Unblocked Data API, which resembles a Microsoft Entity Framework provider. The Data API then log-ships these changes which are processed by other instances of the application. While the Platform uses IndexedDB on end users' devices, it also could be configured to use an external NoSQL style database for larger device-class nodes such as Server based instances.

To any developer using Unblocked Platform, they see operations they perform against a database, and to them, this is identical and the same as any traditional client/server application. Reducing the need for specialist ledger experience and skills. However, our innovation underlying this traditional database presentation layer, is our own distributed ledger we've developed. Each instance of the application is running a node, which manages and processes transactions across the distributed ledger.

One could consider the Unblocked Platform provides an efficient method for distributing database transactions securely across a peer-to-peer network. While each application instance runs a node, the local database only holds transaction data that are relevant to the system, application or user.

The Platform as currently designed offers incredible global scale, and further the Platform ensures the immutability and security of the data while delivering performance at native application and data speed.

Component Overview

Applications

Applications are written in C# (dotnet core) and can leverage packages we've provided as part of the Platform. These applications are compiled using the Microsoft Blazor framework and run within WebAssembly within a browser. There are two types of application configurations:

Client Applications

These run inside a browser from a URL or published in an app store and interact with the user.

Server Applications

We expect that developers, businesses, governments or non-profits to build their applications and deploy on the Platform in this type of configuration.

These more significant device-class instances or 'Server' nodes are intended to run headless such as with Headless Chrome, or in the form of cloud-provided scalable compute or traditionally in existing datacentres.

The rationale for this configuration is to provide increased performance and to interact with large existing datasets, business systems or legacy applications with ease. Enabling the Platform to be integrated and coupled with existing solutions or be the basis for a whole new distributed solution. Distributed ledger Each Unblocked application running on the Unblocked Platform has its own distributed ledger, which is identified by a unique identifier (GUID).

Each distributed ledger is constructed using a chain of blocks which, as well as being self-referential, also contain the transactions which each application instance creates when attempting to send a message or make a change.

To provide an increase in performance and to leverage the node running on low-powered devices, the chain is broken down into epochs, which is as a contiguous series of blocks relevant to the temporal requirements of the operating application. For example, in a fast-moving application, an epoch may be an hour, in a slower application, it may be a month.

Each application on the Unblocked Platform has a genesis block for its own distributed ledger. Genesis blocks are also stored and licensed on the Block and Chain master ledger on the Platform.

The Platform and it's supporting architecture allow for different unique ledgers mitigating most issues on consensus and forking or changes to public ledgers. Further, as each unique ledger is part of the Platform's ecosystem, we expect to have capability to enable or disable communication between all ledgers. The structure of each block is below:

the tree hierarchy. For more details on Marc's design see Merkle Tree

The Distributed ledger consists of Blocks.

A Block has a list of Transactions which have been validated by the localhost node.

Each transaction is represented as a hash in a structure that allows the rapid validation of the entire list (at any point in the transactions list) without having to compute validity against the entire transactions list.

The Unblocked Platform Merkle Tree resolves this.

Each Block has a property of type UPMerkle. The UPMerkle property is a hash tree of all the transactions in the Block with binary branches until a single root node hash represents the hash of the entire tree.

The class [UPMerkleTree] contains the verification methods for Audit and Consistency Proofing of the tree.

[UPMerkleNode] can be the Full Tree, a binary branch (as branch only ever has two direct children) or a leaf at the bottom of the hierarchy Block class has a single [MerkleNode] class which constructed on Block creation via a BuildTreeQ method which takes the entire transaction list and creates a Merkle structure which is stored in indexedDB.

The Tree is a hierarchy of hashes with the lowest level leaves being a hash of an actual transaction and branches above that being hashes of the left and right binary structure below the node. There are only ever two structures below a node. A parent node can only have two children according to Merkle theory.

The Block class has a main method that gets the Root Flash of the Merkle tree which is used for all validations Branch with an odd number of children will reuse the left child (as it doesn't have a right) to make the hash.

MerkleNode as a Leaf

A hash representation of one single transaction.

MerkleNode as a branch

Distributed Ledger Entries

| Field | Data Type | Default Value | Description |
|---|---|---|---|
| Index | long | 0 | a unique, incrementing integer, starting at 0 |
| Timestamp | DateTime | now( ) | the date and time the entry was written |
| Chain | GUID | 50ff84e8-93b4-44db-b362-a082a1fc8e69 | Unique id of the chain |
| Epoch | long | 0 | Incrementing integer detailing the current epoch |
| PreviousHash | string | N/A | The calculated SHA256 hash of the index-1 block in this chain |
| Hash | string | N/A | The calculated SHA256 hash of this block |
| CreatedStamp | DateTime | now( ) | Date and time the node created the block using its clock |
| Data | binary | N/A | For future expansion |
| Transaction | string | [ ] | A JSON Array of transactions |

Merkle Trees

The Unblocked Platform uses a Merkle Tree to rapidly and efficiently validate a list of Transactions within a Block. Our implementation is based on Marc Clifton's design but uses Transaction hashes as the tree leaves at the bottom of Binary structure with Left MerkleNode to its left in the list (can be a leaf or another branch)

Right MerkleNode to its right in the list (can be a leaf or another branch) Represented as a hash of its children branches and leaves MerkleNode as a tree RootNode with all its child branches down to the leaves Represented as a hash of everything below it Nodes A Node is the software which communicates on, collaborates on or works with the Unblocked Platform's distributed ledger. The node software is encapsulated within the NyGet Package BC. Node It has the following dependencies:

BC.FileReader

BC.PKI

BC.Shared

BC.IndexedDB

Microsoft.AspNetCore.Blazor

Microsoft.AspNetCore. Components. Browser

Newtonsoft.Json

These dependencies are subject to change in the future.

The Unblocked Platform Distributed ledger is a blockchain instantiated in Microsoft.Net Core which includes as its payload compiled Common Intermediate Language (CIL) (https:/en.wikipedia.org/wiki/Common Intermediate Language) which contains the BC.Transaction class. Each transaction within the distributed ledger is a fully contained dotnet core component, compiled to produce specific outcomes when executed or tested.

The genesis block is the first block in a chain and in Unblocked, it includes software to test or validate each transaction to prove they are valid.

Transactions

Transactions are any action that can be encapsulated as part of the BC.Transaction class which includes:

BC.Transaction. Pay(payor, payee, amount, balance)—Pays the payee the number of tokens, leaving the balance to the payor.

BC.Transaction. Message(src, dst, msg)—Sends a message from source to destination, encrypted with destination's (DST's) Public Key and signed with sources (SRC's) private key BC.Transaction. DBAction( )—Performs an action against a local indexedDB Transactions operate as follows:

1. A Transaction is initiated by the application software and sent to the node running in our software. A Transaction is sent to a node as a valid C# string. The Node compiles the C#.
2. The Node runs unit tests against it which have been previously loaded from the genesis block to prove it works as expected and if it does, it adds it to a local queue of candidate transactions.
3. The candidate transaction is sent to each peer, parent and child to validation and adding to the queue (as in step 2)
4. The Founder Node writes all valid transactions to a block which is transmitted
5. On reception of a valid block, all nodes remove included candidate transactions from their queue.

BC.Node

A Node is a specific software component, and nodes take one of several roles:

1. Full Node Manages the entire blockchain and checks the validity of each blockchain
2. Founder Nodes write blocks to the blockchain based on votes provided by members with coins
3. Epoch Node Manage the entire epoch of a blockchain and checks the validity of each blockchain
4. Wallet—holds a user's private and public keys and allows them to send a transaction to a node.

It should be noted that our node software is one library which takes different roles Node Communications Nodes communicate using WebRTC and this communication is additionally enabled by a central STUN and TURN Server. This allows for peer-to-peer traffic to cross NAT boundaries Nodes have a single parent and 1 or more children. Nodes send information to their children and receive information from the parent.

Parents must be Full Nodes.

Children can be Full Nodes, Founders, Epoch Nodes and Wallet

When a Node has too many children (>MAX_CHILDREN), it instructs the first active node that connected to become a parent and send any newly registered nodes to the child.

If a child reports back that it cannot find the allocated parent, the node allocates the 2nd (and so on) active node to become a parent.

The hierarchy can be as deep as we wish.

MAX_CHILDREN is defined in the genesis block of each chain.

The top MAX_CHILDREN nodes are created as Full Nodes and operate as follows:

1. The First Node comes up, attempts to contact every active Node in a loop.
   1. If it contacts a Node, and there are less than MAX_CHILDREN active Nodes, it becomes a top tier Node and requests the blockchain from another (random node)
   2. If it cannot contact any other node, it becomes a Full Node and requests the blockchain from the central server less function.

2 Every time one of these nodes gets a block, it checks it for validity and if valid checks with the Server. If its chain is longer, it writes to the Server Functions.

3. If its chain is shorter, it reloads the chain from the DB and revalidates it.
4. Every time a node comes up, it checks to see if there are MAX_CHILDREN active and if there are less than MAX CHILDREN, it becomes a full Node 2
5. If there are >=MAX_CHILDREN Active Nodes, our new node attempts to become a child of a random node. That node may reply as follows:

1. DENIED—Cannot become a child for some reason, find another node
2. NEXT_STEP—I already have MAX_CHILDREN Nodes, here is a list of them, attempt to become a child of one of them c
3. APPROVED—You then become a child of that node.

Founder Nodes are special and are features of a full or epoch node.

Each time a block needs to be written, Users with Tokens vote on who can write the block based on Ping Time, UpTime and trust. They vote with their number of tokens. The Peer with the top votes (or >50% available votes) becomes a Founder and is allowed to write the next block.

The Founder Node transmits the new block to all PARENTS and CHILDREN and PEERS The top MAX_CHILDREN NODES are PEERS All Children of a Node are PEERS and can talk to each other.

Node Communications Syntax

Node Communications are as follows:

PING—Checks to see if a node is alive. Respond Alive or nothing

Nodes which receive a PING must respond with ALIVE

NEWTRANS Sending a new proposed transaction

Nodes which receive a new proposed transaction respond with an ACK or Acknowledgment.

They then validate the transaction and if valid, add it to their list of pending transactions and forward it to every peer, child and parent NEWBLOCK Sending a new Blockchain Nodes which receive a new blockchain must compare with the current length If the new blockchain is shorter, discard If the new blockchain is longer, validate then adopt If adopted, they need to send new blocks to every peer, child and parent REQ_CHILDREN—Request for a collection of this nodes Children Nodes that receive this request must respond with a list of children.

CHILDREN—Response, a Collection of this blocks children

Nodes which have requested this must process this for the reason they requested it.

If a node receives a CHILDREN unsolicited, it must reduce the amount it trusts the node that sent it.

REQ_PEERS—For a Child Node, it is requesting a list of its PEERS

If a node receives this from a registered child, it must respond with a list of its (the receivers) children which will equate to the peers of that node.

REQ_CHAIN—Request for the Blockchain

Any node receiving this request, must respond with the blockchain.

REQ_EPOCH—Request for an Epoch

Any node receiving this request must respond with the Epoch

ADDVOTE—Receive a vote from a User—Uses the blockchain to look up their current balance Any Node receiving this, with a list of pending transactions adds it to their votes until they have >50% of the votes when they may write a new block and transmit it.

CHAIN—Response of the Whole Blockchain

Any node which asks for this will receive it

Any node receiving this unsolicited with reduce the amount it trusts the node that sent it.

EPOCH—Response of and Epoch

Any node which asks for this will receive it

Any node receiving this unsolicited with reduce the amount it trusts the node that sent it.

REGISTER_CHILD—Request to Register as a Child

Any node receiving this will respond with one of the three below.

REG_RESP_DENIED—Register Request DENIED—Sent if we don't trust a node or ping time is too long, or too many errors REG_RESP_NEXT_STEP Register request Next Step. Expect next request to be a REQ_CHILDREN If this node has >=MAX_CHILDREN active, it responds with this REG_RESP_APPROVED—Registration Approved—If a node gets a REGISTER CHILD from a valid, trusted or new node, and has <MAX_CHILDREN, it will respond with approved and add to the list of children.

Nodes communicate with each other using WebRTC—WebRTC is a free, open project that provides browsers with Real-Time communications (RTC) capabilities via simple APIs.

Node Hierarchy is depicted in FIG. 6.

The FIG. 6 embodiment depicts a top layer of full nodes mapped to a lower layer of epoch and wallet nodes, including further sub-level dependencies between the epoch and wallet nodes.

Proof of Stake

To found or create blocks, we use a proof-of-stake model. Nodes who receive a new and valid block vote with the current tokens held by addresses available in the application based on the following:

$$\sum \frac{u}{pt}$$

Proof of Stake Equation

The formula for calculating the node to vote for is the node with the highest of the value above where:

t is the trust factor of the node which increases from 1 by 1 every time a node sends a bad block, a bad transaction or an unsolicited message (as above)

tv is the calculated uptime of the node, from first communication to last communication p is the ping time of the node, i.e. how long it takes to reach a node in ticks For example, for a node, which has not done anything wrong, uptime is 200000 and ping time is 5000, the score is:

200000/1*5000=40 Conversely, the same node which has sent four bad blocks, the score is:

200000/4*5000=10

If a node receives votes, it needs to calculate whether it has more than 50% of the votes available in the hierarchy. This is complicated as a node can only see its peers, children and parents.

However, it can estimate the total coins available by querying MAX_CHILDREN. It needs to add 2% for every value of MAX_CHILDREN.

The flowchart for calculating votes is as follows:

2. If the Node is a Full Node, it can speak to its peers. If it has >50% of the votes of its peers, it can become a founder.
3. If the node is an epoch node, it needs to have >(50+MAX_CHILDREN*2) of the votes of its peers and children Central Functions The Platform relies on a few central functions to enable the communication and discovery of nodes, chains and blocks. These functions are analogous to Internet DNS services and primarily provide lookup and persistence functions. They are detailed below:

Function Abilities

Name blocks Stores a complete copy of any applications' ledger chain. Allows lookup and for full nodes to write chains addresses Stores a directory of addresses and public keys nodes provides a directory of full nodes for various chains

Addresses in order to communicate data across the system, the platform uses a system of addresses. An address is defined using the structure below:

| Field | Description |
|---|---|
| Address | GUID containing a unique Address |
| Chain | The chain this address is associated with |
| PublicKey | The Public Key of the Address |
| PrivateKey | The Private Key of the Address |
| Title | Text Description of the Address |
| UserID | The UserID of the Address (if applicable) |

A central function stores addresses and public keys.

Users Many systems have the concept of users. Each application can have its user system, which usually leverages a 3rd party identity provider to provide authentication into the system. Once users have authenticated, they can continue to use the system once they have provided the relevant private keys.

Configurator

At the heart of the developer experience of the Unblocked Platform is the configurator. This web-based application allows end-user developers to create applications incredibly simply using a simple user interface.

Using the configurator, the end user developed defines data models, navigation and permissions. The configurator generates the C#, user interface and application.

The configurator then publishes the source code to GitHub and publishes the application to GitHub Pages and presents the end user developer with a login.

FIG. 7 is a block diagram of the configurator illustrating a series of method steps for an application lifecycle, tracking a progression from initial configuration steps consisting of detail selection, design selection, model definition, and authentication selection through to a final publication stage.

The configurator has the following steps:

Choose Basic Details

The application developer inputs basic details about the application including their details, the company and the name of the application.

Choose Design

The end-user developer can work from a number of bootstrap designs and can also choose from commercially available bootstrap templates.

Define Models

The end-user developer then chooses from data model templates or adds their own, for example it is easy to create a customer database here.

Chose Authentication

The end user developer can choose authentication options from the following:

Microsoft Account

Microsoft (Office 365)

GSuite

Google

Azure Active Directory

Or any supported OAuth provider

Publish

Once the design wizard is complete, the developer clicks publish and enters a GitHub account. The source of their new application is uploaded into GitHub, and we compile (build) the application and publish it to their relevant GitHub pages location.

Following this, the developer can run and distribute their application or simply change and recompile.

Architecture

FIG. 8 depicts the Unblocked Platform Architecture. The diagram depicts an application-level layer segmented by a dashed boundary from an underlying system layer, wherein the application-level layer includes user interface and application functions, and the system layer provides data, transaction, and storage APIs. Each of these individual components is described in detail below.

The diagram above shows the Unblocked Platform Architecture. Each of these individual components is described in detail below:

Unblocked Applications

Applications are created by developers initially via the Configurator and then further developed using standard tools. All Applications are registered in the Block and Chain master ledger.

Applications leverage a container approach which then leverages the solutions and components published to deliver UI Elements The Unblocked Platform is delivered with several preconfigured User Interface (UI) Components. Over 60 components are available for end-user developers to use these to develop their own systems.

App Functions

The App functions library contains common functions applications may need to employ. This is currently under development.

Data API

The Data API provides agnostic access to the tables, views, queries and more of the data stored in the application. It is responsible for serving LINQ (Language Integrated Native Query) objects and functions to allow end-user developers and applications to communicate with what they think is a local database, while also managing what gets communicated to the DTLAPI. Application API The Application API provides access to the following application functions:

Authentication

Messaging

Cryptographic functions

Service Functions

Service functions are serverless functions which provide a level of central storage similar to address book lookup systems or DNS Servers

DTL API

The DTL API is a closed API which provides access to the Distributed Transaction Ledger.

The node has the following methods, properties and events

Node

| Type | Name | Description |
|---|---|---|
| Constructors | | |
| Public method | Node | Initialises a new instance of the Node class |
| Properties | | |
| Public property member | StaticActiveFullNodes | Contains a list of the current active full nodes |

-continued

| Type | Name | Description |
|---|---|---|
| Public property Static member | AliveMessagesReceivedFrom | Contains a list of nodes alive that messages are received from |
| Public property member | StaticAllFullNodes | contains the current list of full nodes |
| Public property Static member | BlockchainLoadedFromDatabase | A flag as to whether the chain was loaded from the central functions or not |
| Public property Static member | CurrentActiveFullNodesCount | the count of current full nodes |
| Public property member | StaticErrorMessage | The last error message |
| Public property Static member | FoundActiveNode | Flag if an active node is found |
| Public property | FullNodesContactCompleted | Flag if the full nodes contact cycle has completed |
| Public property member | StaticFullNodesContacted | A list of fully contacted nodes |
| Public property Static member | InactiveFullNodes | A list of inactive full nodes |
| Public property member | StaticMaxChildCount | The max_children |
| Public property Static member | MaxFullNodesCount | The max_FULL |
| Public property member | StaticMyPendingMessages | pending messages |
| Public property member | StaticMyRequestsExpectedResponses | A list of requests expecting responses |
| Public property | MyUser | The address of the current user |
| Public property member | StaticMyVotes | My List of Votes |
| Public property Static member | NodeDistrustMax | Node distrust max limit |
| Public property member | StaticPingMessageRecievedFrom | a list of nodes where we have a ping message |
| Public property Static member | PingResponseTimes | a list of ping response times |
| Public property member | StaticUpTime | My Uptime in ticks |
| Methods | | |
| Public method | AddFullNodeToDb | Create a brand new node and advertise centrally |
| Protected method | BuildRenderTree | |
| Public method | CheckForMyMessagesInChain | Check for my messages in the blockchain |
| Public Static member | methodDistrustNode | Distrust a node by extracting its id from the peerJS error message |
| Public method Static member | DistrustNodeById | Distrust a node by its id |
| Public method | GenKeys | Generates Keys |
| Public method | GetAllFullNodesAsync | Async method to get all full nodes from the DB |
| Public Static member | methodMessageMyChildNodes | MessageMyChildNodes |
| Public method Static member | MessageMyParentNode | Send a message to my parent node |
| Public Static member | methodMessageMyPeerNodes | Send a message to all my peer nodes |
| Protected method | OnAfterRender | OnAfterRender |
| Protected method | OnInitAsync | Decide what I am on initiate event |
| Protected method | Protected method | Lifecycle event |
| Public Static member | methodReceiveMessage | ReceiveMessage |
| Protected Static member | methodReloadChainFromDatabase | |
| Protected method | StartRTC | 2nd action: Register me as a new peer on the peerJS network and get me an RTC Id Persist me to the database |

Appendix One: IndexedDB

IndexedDB is a large-scale, NoSQL storage system, included in the specification for modern browsers. It lets you store just about anything in the user's browser. In addition to the usual search, get, and put actions, IndexedDB also supports transactions. Here is the definition of IndexedDB on MDN:

"IndexedDB is a low-level API for client-side storage of significant amounts of structured data, including files/blobs. This API uses indexes to enable high-performance searches of this data. While DOM Storage is useful for storing smaller amounts of data, it is less useful for storing larger amounts of structured data. IndexedDB provides a solution."

Each IndexedDB database is unique to an origin (typically, this is the site domain or subdomain), meaning it cannot access or be accessed by any other origin. Data storage limits are usually quite large if they exist at all, but different browsers handle limits and data eviction differently.

IndexedDB Terms

- Database—This is the highest level of IndexedDB. It contains the object stores, which in turn contain the data you would like to persist. You can create multiple databases with whatever names you choose, but generally, there is one database per app.
- Object store—An object store is an individual bucket to store data. You can think of object stores as being similar to tables in traditional relational databases. Typically, there is one object store for each 'type' (not JavaScript data type) of data you are storing. For example, given an app that persists blog posts and user profiles, you could imagine two object stores. Unlike tables in traditional databases, the actual JavaScript data types of data within the store do not need to be consistent (for example, if there are three people in the 'people' object store, their age properties could be 53, 'twenty-five', and unknown).
- Index—An Index is a kind of object store for organising data in another object store (called the reference object store) by an individual property of the data. The index is used to retrieve records in the object store by this property. For example, if you're storing people, you may want to fetch them later by their name, age, or favourite animal.
- Operation—An interaction with the database.
- Transaction—A transaction is a wrapper around an operation, or group of operations, which ensures database integrity. If one of the actions within a transaction fails, none of them is applied, and the database returns to the state it was in before the transaction began. All read or write operations in IndexedDB must be part of a transaction. Storing operations within transactions allows for atomic read-modify-write operations without worrying about other threads acting on the database at the same time.
- Cursor—A mechanism for iterating over multiple records in the database.

Our Use of indexeddb

As Unblocked was developed, it became apparent that we needed a system for local persistence of data and information. On a low powered device, navigating through blocks and Merkle trees was computationally intensive and complex. If we could persist data in a structured database, it would make the development of application simpler and faster and enable multiple new scenarios.

We initially stumbled across this implementation: wtulloch/Blazor. IndexedDB which formed the basis for our implementation. While Bill's implementation is naive, we have extended the platform to provide the full functionality we need while ensuring that this open-source project is kept up to date with the latest Blazor developments.

IndexedDB, therefore, provides the persistence model for our applications, delivering a full document database allowing developers to write code that does not need to consider how this data will work with other instances of the application.

The following are the various actions and how they operate:

IndexedDBService

The IndexedDB Service class provides the core functionality to access the browser IndexedDB from a Blazor application running in WebAssembly. It consists of the following Methods:

- CreateDatabase—Creates a Database
- GetDatatabase—Obtains a database given the database name
- GetDatabases—Retrieves a list of databases in the browsers IndexedDB Database The database class is used to define, create and work with IndexedDB Database.

It has the following methods

Database—This constructor creates a new database

It has the following properties

Name—The name of the database

Stores—a list<Store>of stores in the database

Version—the version of the database

Index

The index is a special type of store that allows the incredibly quick retrieval of items based on an index It has the following methods:

Index—This constructor creates a new index

It has the following properties:

Auto

KeyPath

Name

Unique

Store

The store represents an indexedDB store, the key area of data storage.

It has the following constructors:

Store—Creates a new instance of the store class

It has the following Properties

Indexes

IsDeleted

Name

Primary Key

It has the following methods

Add Record—Adds a record

Clear—Clears all records from the store

Delete—Deletes the store

DeleteRecord—Deletes a record

GetAllRecordByIndex—Gets all record by index in the store

GetAllRecords—Gets all records from the store

GetRecord—Gets a record by Id in the store

GetRecordByIndex—Get a record by Index in the store

Update—Updates indexes of this store

UpdateRecord—Updates a record

The foregoing method and system have a number of benefits vs traditional systems and methods of working, not the least that it can provide a distributed platform whereby minimal infrastructure is required to run applications and complex multiuser applications can operate securely without the requirement for extensive hosting services.

One or more embodiments of the invention may comprise one or more of distributed ledgers or blockchains (blockchains) as a way of synchronising data between a blockchain instance running fully operational or participating, ephemeral or otherwise, blockchain nodes possessing a full copy of the blockchain or Epoch and one or more SQL or Non SQL Databases or Indexed Databases such as or similar to IndexedDB[7]. Said Database may advantageously be located in persistent storage on the User device. If a User device was lost or damaged a fresh copy of the database could be recovered at least by replaying the blockchain whereby the blockchain node running on the User device would unpack all blockchain transactions with a User related Address and send it to Database management system to be written in a new database.

[7] https://developers.google.com/web/ilt/pwa/working-with-indexeddb

It is proposed that Applications employing the present invention would operate as if the said Application was addressing a database and the transactions or messages to create, read, update or delete transactions in the database are passed to a data access layer API (DAL) which manages or assembles transactions messages so they can be passed to Node management software and or to software and written to one or more of or both of blockchains and databases and including one or more local database in a User device. In other instances a Node on a blockchain and software controlling a database may send data to and receive data from each other. Said Databases in said User device could, for example, be set up to contain only transactions related to the user of the device in which the database and blockchain are held also in a blockchain and said blockchain transactions having addresses for which the user possesses the address and public and private keys. Said Address and Public key are stored in the blockchain or in a server or other database. Said addresses are User addresses or addresses necessary or useful for the User to be able to perform actions including gain access to, or run certain applications i.e. addresses for which the User has the private key (Addresses). Said addresses may contain an indicator or code to identify the ID of a blockchain to assist in determining the actions to be taken by software managing the system. Said addresses may also additionally identify business entities, divisions, departments, operations, groups, personnel, assets, projects, expenses, income, processes, procedures, actions, authorisations or anything required to be or which can usefully be identified within a business or government or not-for profit enterprise such that for example authorizations by particular personnel could be promptly identified.

Said local database could provide instant access for a User to Create, read, update or delete transactions whilst also creating and adding a transaction to a queue of proposed transactions for the next block to be written into a blockchain and write into the next block in a blockchain.

Transactions in the blockchain and database may for example contain the executable code of any Application capable of running in a web browser and which can be launched and run within the User device without, or at least with minimal, dependency on a central server or database.

The sequentially written blockchain records could as necessary be read and or searched and records recovered and compared with a corresponding database to verify that the said database reflects exactly the transactions in the blockchain. Said blockchain transactions could be written out again to refresh an existing database or create another or copy database. For example if a User obtained a new Address then upon demand or automatically on detection of a new address the management system could launch an update of a users database by "replaying" the blockchain to filter into the Users database all blockchain transactions having addresses and private keys, including said new address, to which the Users Node management software has access.

User/Clients addresses created by the User in relation to one or more Blockchains and which said addresses are recorded with or as part of, and to identify, each of transactions initiated by a user or addressed to a User using said Users unique address on each particular blockchain and said transaction may also record, either appended to Users address or separately, additional addresses or identifier portions identifying the transaction within a hierarchy appropriate to the function of a particular enterprise blockchain or distributed ledger system and said addresses or identifier portions or any of their parts identify the transactions added to the local database or databases maintained on each User device. Optionally, further identification of Blockchains may be accomplished by providing an identity code as part of each block unique to each blockchain.

With the database and Blockchain records in a state of synchronisation the Database can provide fast access for all User purposes including creating a new transaction or updating an existing transaction or deleting a transaction. The system will reflect these Database transactions by creating corresponding blockchain transactions. The Database is generally updated immediately so the user has instant access to all database transactions information.

There is some delay between the writing of a database transaction to a database and the writing to a blockchain of a copy of that database transaction but the present invention blockchain using a proof of stake consensus method referred to elsewhere herein is quite fast at writing blocks to the blockchain relative to writing of blocks to other blockchains.

The operating code of the system 1) identifies which transactions in a blockchain have been applied/added to User databases and
2) decrypts said blockchain transactions having an address relating to the User and said address and private key of said address available to the Node software and adds as transactions to the User database said blockchain transactions.
3) In addition when User database transactions are initiated by a User running an application said transactions pass to and/or through a Data Access Layer API for translation or manipulation as necessary to:—a) input for Database software to immediately write the transaction to the User database with a flag as necessary to indicate a transaction not yet written to the blockchain. Once the candidate block, containing the relevant flagged transaction, has been validated and written and added to the blockchain or distributed ledger, there is a process described elsewhere to remove said flag. b) and also input to, and in a form for, the Node software to receive the data as a transaction to be placed in the queue of proposed transactions to be written to the blockchain (candidate blocks) and subsequently written to the blockchain. Said transaction data sent to said node may include compiled computer code c) Note: the system can be arranged so that at least a copy of the transaction data is in a proper form and said data passes straight to the User database from the APP.
4) Blockchain nodes receive a copy of new blocks after they are written to the said blockchain and upon receipt of a new block a Node:—a) commences validation of new block & upon validation of said new blocks then applies an address filter to identify any of the transactions in the new block with addresses matching any of the addresses associated with said node or its user client account or User device and for which addresses the Node has access to private keys of the said addresses, so that these "identified" transactions can then be de-crypted and passed to the Data Access Layer API.
   b) Updating the Database directly by executing the code in the transaction to update the database or
   c) translation or manipulation into a form suitable for a database transaction and said translation can then be executed directly to update the database or passed to the Database Software which writes the "identified" transaction to a database.
   d) Some transactions in said new blocks may confirm earlier transactions written to the database with a flag that have now been written to the blockchain. Upon receipt of said confirming transaction having been written to the blockchain, said flag is removed or replaced by an indicator that the transaction is recorded in the blockchain.

Any one or more of the above embodiments or preferred features can be combined with any other embodiment or feature and/or with any one or more of the above aspects.

While there has been shown and described at least one preferred embodiment of an Improved computer architecture and software systems and methods supporting simpler and more secure blockchains, it will be appreciated that many changes and modifications may be made therein without, however, departing from the essential spirit thereof.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

In this specification a database (be it SQL or NoSQL/Non-SQL), is intended to mean a series of transactions written in an order and able to be updated or deleted.

In this specification the term "blockchain" is intended to mean: a construct of blocks of data connected together using hash pointers and representing a series of transactions performed between users of a peer-to-peer network, and/or a sequential series of records or transactions immutably written to and stored in a sequential chain of blocks.

In this specification the term "node" or "user node" is intended to mean a software application which participates in the management of a blockchain.

In this specification the term "wallet" is intended to mean a piece of software which communicates with and proposes blocks for the blockchain.

In this specification, the term "WebAssembly" or the acronym "WASM" refers to a technology whereby common browsers operate a stack based virtual machine that allows common development languages to be compiled for it, such as described in https://en.wikipedia.org/wiki/WebAssemblv.

In this specification, the term "Blazor" is intended to refer to an experimental framework allowing .Net code to run under WebAssembly, such as described in https://dotnet.microsoft.com/apps/aspnet/web-apps/blazor.

In this specification the term "WebRTC" is intended to refer to a proposed standard for peer-to-peer data, voice and video conversations between computers running browsers, such as described in https://en.wikipedia.org/wiki/WebRTC. The invention consists in the foregoing and also envisages constructions of which the following gives examples only.

All publications, patents, patent applications and other documents cited in this application are incorporated by reference in their entirety for all purposes to the same extent as if each individual publication and/or other document were individually indicated to be incorporated by reference for all purposes.

BRIEF DESCRIPTION OF DRAWINGS

Preferred embodiments of the invention will be described by way of example only and with reference to the drawings, in which.

DETAILED DESCRIPTION OF PREFERRED EMBODIMENTS

Figure 1:
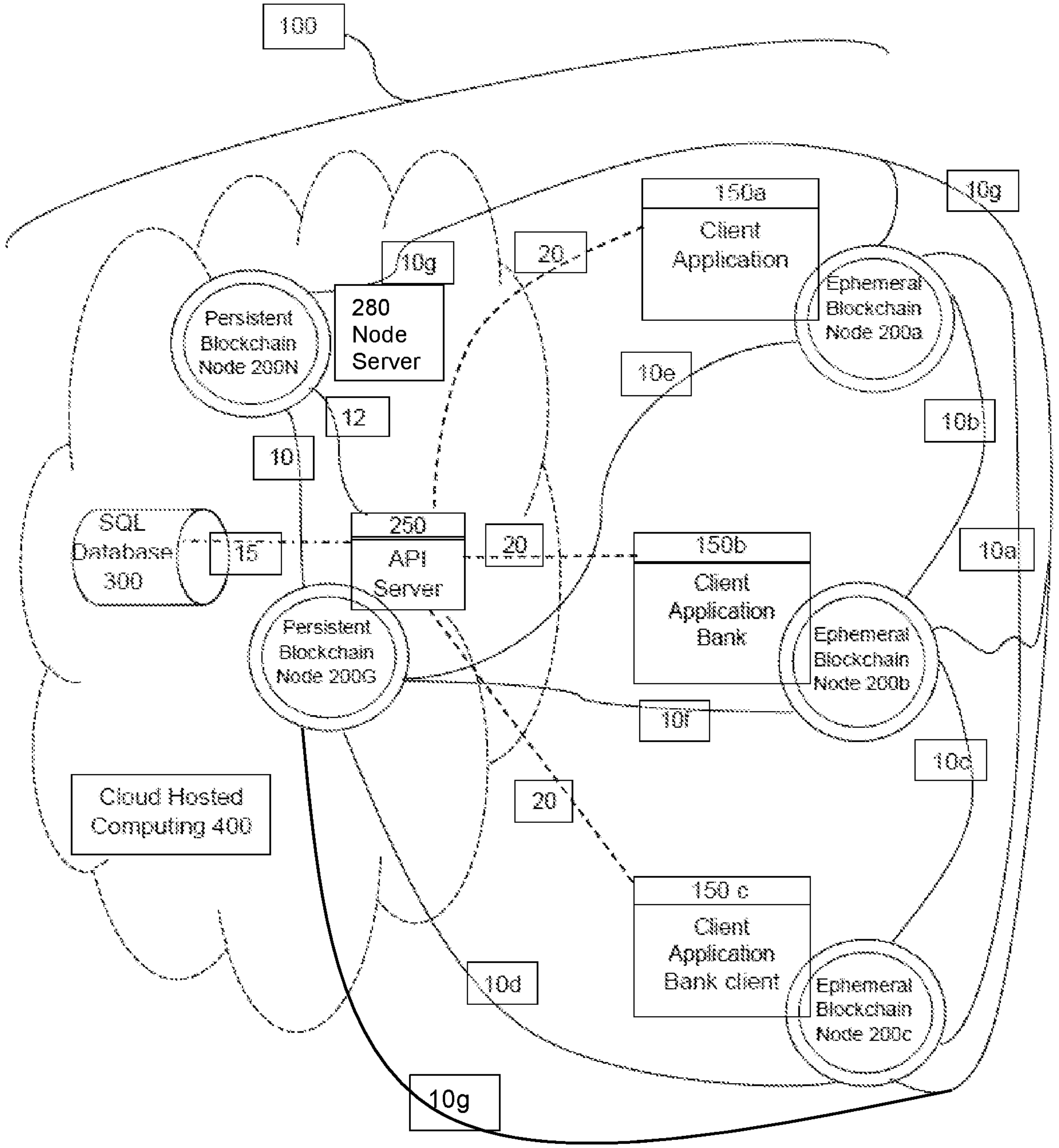
FIG. 1 is a block diagram demonstrating a preferred form distributed ledger system and method of the invention.
Figure 1A:
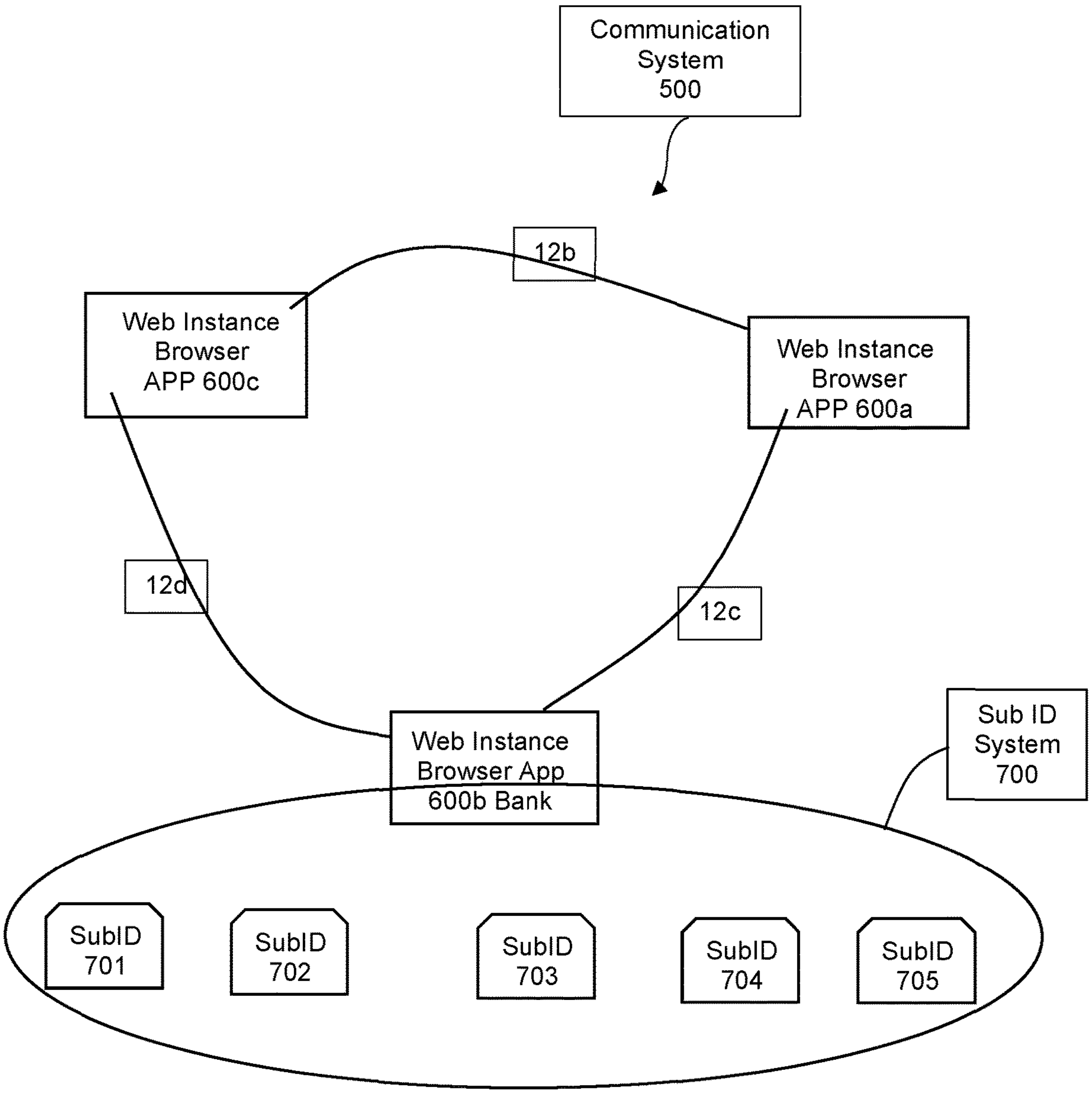
FIG. 1A is a block diagram demonstrating a preferred implementation of the distributed ledger system of FIG. 1 in which a group of users can connect to the system.

This application relates to the following provisional patent application, the contents of which are all hereby incorporated by reference: Australian provisional patent application no. 2019900403 Filed on 8 Feb. 2019; Australian provisional patent application no. 2019900875 Filed on 17 Mar. 2019; Australian provisional patent application no. 2019900898 Filed on 19 Mar. 2019; Australian provisional patent application no. 2019901022 Filed on 27 Mar. 2019; Australian provisional patent application no. 2019901127 Filed on 3 Apr. 2019; Australian provisional patent application no. 2019901191 Filed on 7 Apr. 2019; Australian provisional patent application no. 2019901192 Filed on 7 Apr. 2019; Australian provisional patent application no. 2019901202 Filed on 9 Apr. 2019; Australian provisional patent application no. 2019901288 Filed on 14 Apr. 2019; Australian provisional patent application no. 2019901289 Filed on 14 Apr. 2019; Australian provisional patent application no. 2019901617 Filed on 13 May 2019; Australian provisional patent application no. 2019901625 Filed on 13 May 2019; Australian provisional patent application no. 2019901632 Filed on 13 May 2019; Australian provisional patent application no. 2019901672 Filed on 17 May 2019; Australian provisional patent application no. 2019901673 Filed on 17 May 2019; Australian provisional patent application no. 2019902368 Filed on 4 Jul. 2019.

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc., in a computer program. When a process corresponds to a function, its termination corresponds to a return of the function to the calling function or a main function.

Aspects of the systems and methods described below may be operable on any type of general purpose computer system or computing device, including, but not limited to, a desktop, laptop, notebook, tablet or mobile device. The term "mobile device" includes, but is not limited to, a wireless device, a mobile phone, a mobile communication device, a user communication device, personal digital assistant, mobile hand-held computer, a laptop computer, an electronic book reader and reading devices capable of reading electronic contents and/or other types of mobile devices typically carried by individuals and/or having some form of communication capabilities (e.g., wireless, infrared, short-range radio, etc.).

FIG. 1 Is a schematic view of a preferred embodiment of an improved computer architecture software system enabling and supporting simpler more secure and efficient systems deploying one or more blockchains as part of the system.

System 100 is an improved computer architecture software system enabling and supporting simpler more secure and efficient systems deploying one or more blockchains as part of the system (System) comprising; an application server or server system API Server 250 having communication connections 20 with Client Applications 150*a*, 150*b* and 150*c* which reside on Client Devices. Said Client Devices may also be referred to as Client Devices 150*a*, 150*b* & 150*c* and may consist of one or more of mobile or smartphones, personal computers, tablets or any device capable of supporting the running of a modern web browser.

The Client Applications 150*a, b* & c each contain a synchronously operating fully operational blockchain node respectively 200*a*, 200*b*, 200*c* each of which are able to communicate freely using WebRTC with each other and others of said synchronously operating fully operational blockchain nodes on others of Client Devices and any others of synchronously operating fully operational blockchain nodes such as 200G and 200N connected to the API Server System 250. Node 200N has communication connection 10 with API server system 250.

Communication connection 15 connects API Server System 250 with SQL Database system 300. A PEERSERVER 280 may as necessary be included with connections similar to those shown or as shown for Node and/or API server 250 and said PEERSERVER provides to Nodes, for one or more blockchains, one or more of Blockchain Node Id address, WebRTC address, IP address, so that Nodes may communicate with other of Nodes in one or more of text/video/image/voice means and by one or more of methods broadcast to all or 1 to 1, or 1 to many, or many to many.

Communication connections 10*a* to 10*g* provide peer to peer communication capabilities between nodes 200*a*, 200*b*, 200*c*, 200G and 200N. Node 200N also shows yet another preferred embodiment whereby Nodes may be provided with direct communication connection to each API server here shown is communication connection 12 between node 200N and API server system 250. One or more Node Communication Servers 280 may be connected to provide and maintain node addresses for all nodes registered and/or participating in one or more blockchain systems so that new node addresses may be issued to new participants on a blockchain and active participating nodes on a blockchain may be recorded and monitored as active or otherwise. Node Communication Servers 280 are shown connected via link 10*g* but may be positioned where appropriate in the system to be in direct communication with one or more of nodes, API Server, persistent nodes, SQL database.

Preferably at least said API Server System 250 and SQL Database system 300 and nodes 200G and 200N and Nodes Communication Server or PEERSERVER 280 are scalable and all reside within a public cloud computing environment 400.

Figure 2:
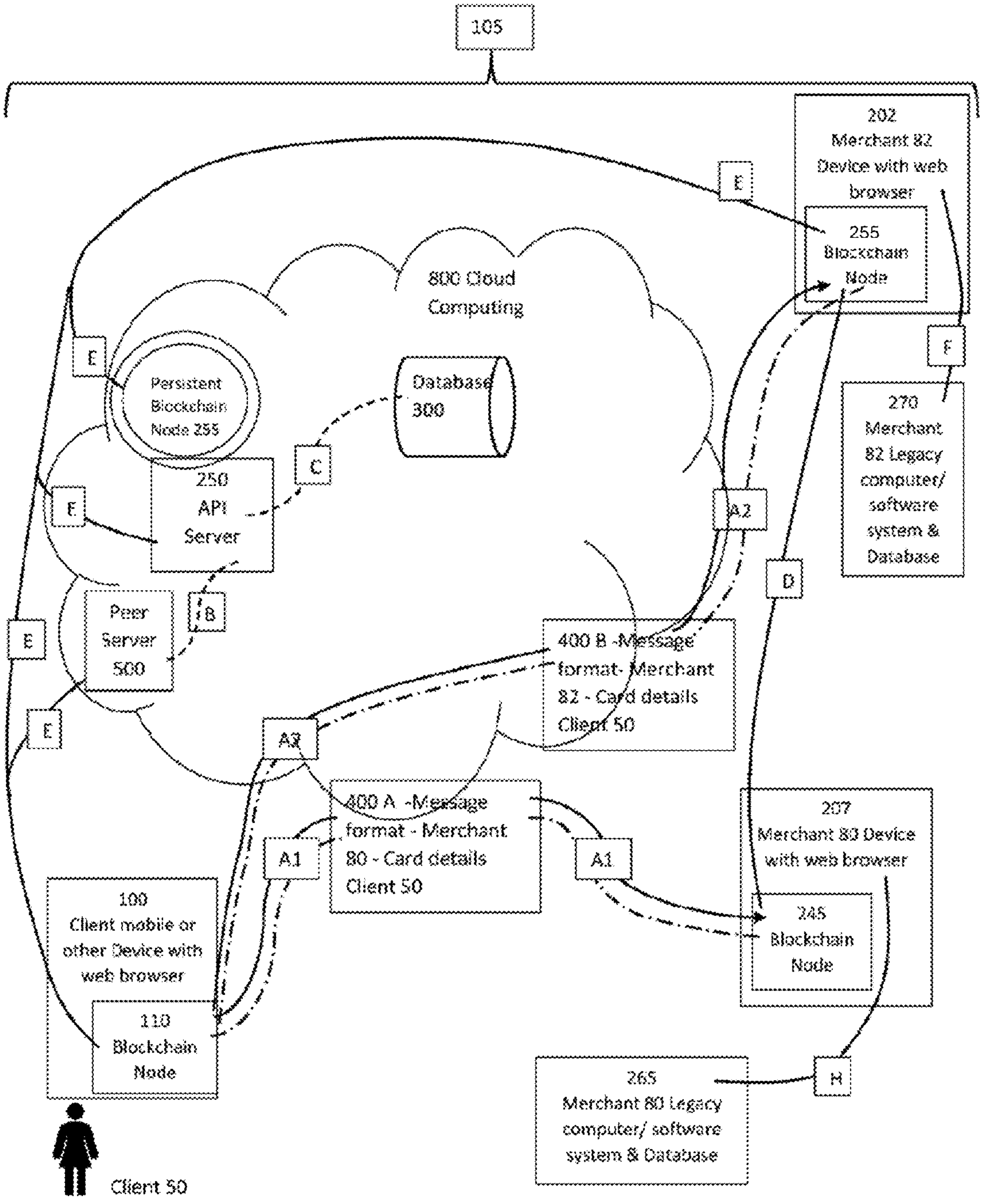
FIG. 2 is a block diagram of a system enabling Users to update financial details with multiple Providers in one operation

FIG. 2 Is a schematic view of another preferred embodiment of an improved computer architecture software system such as a decentralized Application or DApp enabling and supporting simpler more secure and efficient business systems deploying one or more blockchains as part of the system.

System 105 consists the entire system comprising; an application server or server system API Server 250; one or more of a SQL Database 300; one or more of a persistent fully participating blockchain Node 255; one or more Clients 50; one or more client mobile or other devices 100 running a web browser containing a fully participating Blockchain Node 110; one or more Merchants and in the present instance Merchant 80—having computer/device 207 running a web browser with blockchain Node 245 running therein and also having a connection H to Merchant 80 Legacy software/software system (Legacy System) 265 and Merchant 82—having computer/device 202 running a web browser with blockchain Node 250 running therein and said computer/device 202 also having a connection F to Merchant 82 Legacy System 270. The various components connected by a virtual private network (VPN) given effect by Peer Server 500 which provides addresses, for valid users of the Blockchain and or the DApp (User or Users), to the blockchain Nodes associated with each User as their devices come online and commence to run the DApp. The connections depicting said VPN in the present example are marked A1, A2, B, C, D & E. Connections B & C not depicted as directly in connection with any Nodes on the blockchain are or may be necessary for communications between devices and may be considered as part of the VPN. The method of operating the system comprises;

Client 50 desiring to convey new credit card details to multiple merchants/subscription providers uses personal mobile device or computer 100 and by visiting a website is able to run the present invention DApp commences to produce messages to convey said new Credit card details via an encrypted blockchain message such as message 400A and 400B to respective blockchain nodes 245 and 250 running in the respective devices 207 and 202 of respective Merchant providers 80 and 82 said devices 207 and 202 are also able to run the Merchant part of the DApp. The method to create the message comprises; the DApp having been provided with a list of merchants selected by the Client 50 and the Card details to be provided to said list of Merchants/providers and the Client Private encryption Key, the DApp automatically obtains from secure storage in one or more of the Blockchain Nodes or via connection E and C from Database 300 via API server 250; the particular message layout required to mesh with the legacy computer/software systems maintained by each Merchant/provider in the said list as well as the Merchants Public key, the Merchants address on the blockchain to which the said message will be sent.

The DApp then does one or more of loading the Client Card details and the Clients Id No or Account number with each Merchant/provider in the correct format into each message form for each Merchant providers in said list, encrypting, validating and signing with the Clients Private Key and addressing the message and upon completion of composing each message and, optionally, receiving confirmation from the Client 50 to proceed, to send the messages, the Node 110 associated with the Client 50 sends the multiple messages as shown in the example messages 400A and 400B as transactions to the blockchain addressed respectively to Merchants 80 and 82.

Upon writing of the transactions into the blockchain the messages are in effect delivered and for all Nodes that are live on the Blockchain, said live Nodes commence to validate the blocks and if Nodes associated with Merchant addressees/recipients of the switch messages, in this example Merchants 80 and 82, are live then those Nodes 245 and 250 respectively in the present example will, upon reviewing the new block(s), as addressees/recipients then do one or more of note/validate/decrypt the message as originating sent by a particular customer to update customers records and pass the new Client Card details to the DApp to pass to or otherwise pass directly to the Legacy System to record the new Client details. Upon completion of the Update a message is created or instigated by the DApp, to notify the client/User that the new Card Details have been recorded. Said message is then encrypted with the Recipients Public Key and validated and signed with Merchants Private Key.

Said messages are then written as transactions for the blockchain by Nodes 245 and 250 respectively associated with Merchants 80 and 82 and when a block containing the transaction is written to the Blockchain it is transmitted to all live Nodes and the dotted line paths for connections A1 and A2 depict the return Message path and if Client 50 Node 110 is live then the said node 110 will then do one or more of note/validate/decrypt the return Message as originating from the particular Merchant and said Node and/or Said DApp will add a notification to an unread or waiting messages or similar display on the clients screen and display the message for the Client to read as required or if in the present example Node 110 is not live then as soon as the Client next logs in then the Node 110 will request the current Blockchain and will search for transactions messages addressed to itself and/or its Client or will discover same as part of its review & validation of blocks. Said Node and/or said DApp will then proceed as may be required by the client to display said return message.

In yet another embodiment of the present invention the recording of sensitive Client details in relatively unsecure Legacy computer systems may be replaced by Merchants relying on the present invention highly secure blockchain and/or DApp to be the source of Client Card details when Merchants require such information for billing purposes.

Figure 3:
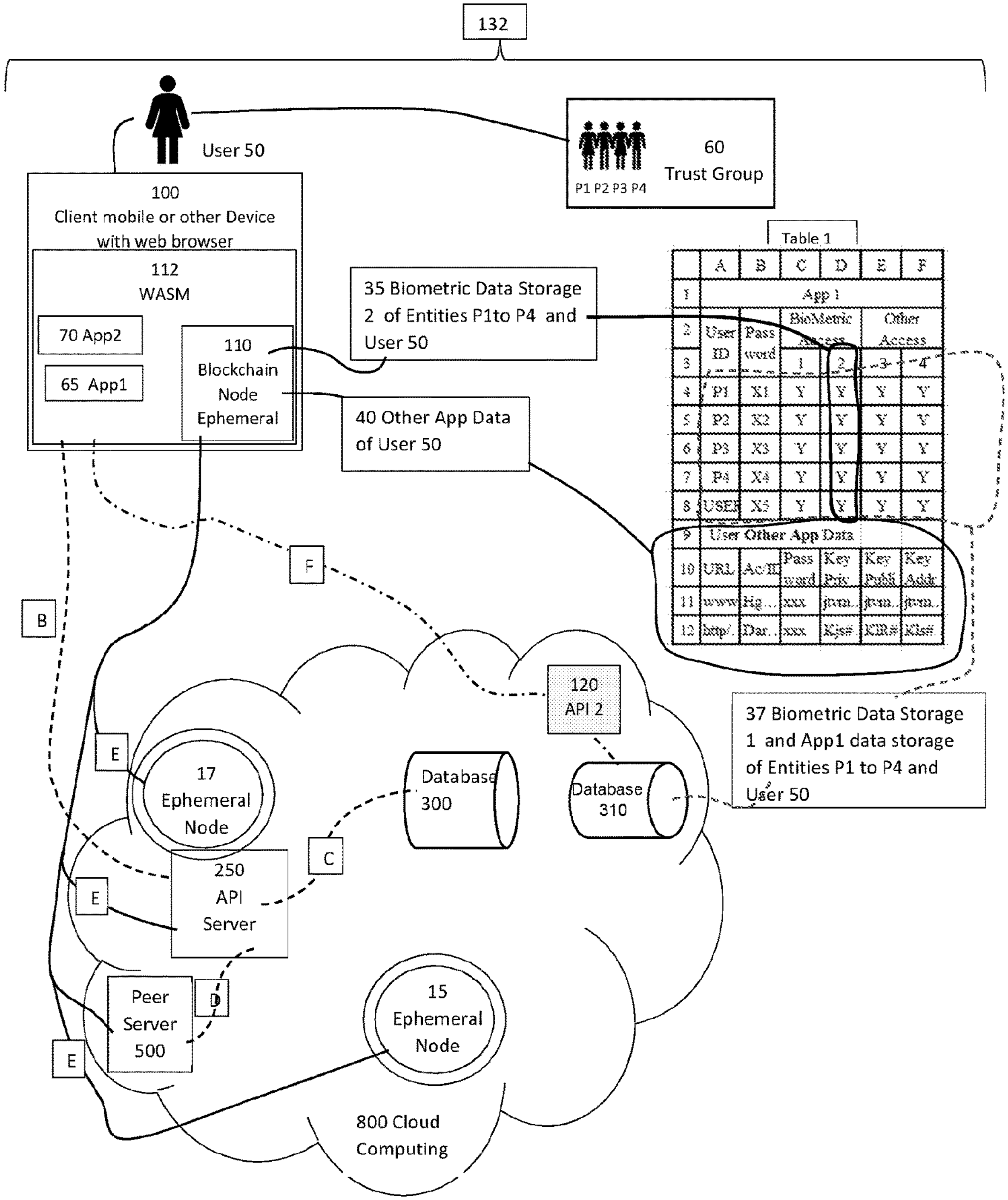
FIG. 3 is a Block diagram of a system of providing secure access to an application Which itself controls secure access to a Users bank accounts and other financial assets

FIG. 3 Is a schematic view of another preferred embodiment of an improved computer architecture software system such as a decentralized Application or App enabling a structured system and method of securely storing and accessing data of a user temporarily or permanently unable to access said data.

System 132 consists of and is populated or given effect by method such that any User 50 having a device 100 operating a modern web browser with a Web-Assembly instance 112 containing/running one or more Apps required by a User and in this example:—a) User 50 has created or arranged creation of certain User accounts in an Application Appl 65 refer Table 1 which table is a part representation of some of the data capturable by Appl of User Id entities at Lines 1 to 8 and columns A to at least F of said Table 1 and specifically:—i) Entities P1,P2,P3,P4—or any one or more of them collectively Trust Group 60 in effect may have access to the device(s) and Apps of User 50 and in this example said Trust group 60 entities have Id and ii) access/security data recorded at Lines 4 to 7 columns A to at least column F of said Table 1 plus other columns not shown which may represent other data stored including but not limited to protocol/permissions/procedures set up by User 50 to allow for access by one or more members of Trusted Group 60 in certain events of inability of User 50 to access critical Apps including Other Apps Data referred to at lines 9 to at least 12 and columns A to at least F of said Table 1.

b) User 50 could commence by running Appl Refer Table 1 which Table shows a representation of some of the data captured by Appl of User Id entities P1,P2,P3,P4 & the User respectively at lines 4 to 8 of Column A in Table 1 and each of said User Id entities being required to verify identity to gain access to Appl by providing password and/or other verification means previously arranged as follows:—Example User ID "User" would have to provide at least Password X5 (refer Column B row 8 of Table 1) to gain initial access to Appl.

Thereafter the further security process is to Set up of Appl whereby User 50 having already set up and entered User 50's own access data for Appl refer row 8 Columns A to at least columns F said User 50 then allocates or provides to each of Entities P1 to P4 User Id's represented by Appl Table 1 rows 4 to 7 Column A to individuals or entities and obtained or obtaining names and details (Name Id) represented at Table 1 rows 4 to 7 in columns E &F or higher and had said entities P1 to P4 privately and separately be or are directed to enter passwords XI through X4 represented at lines 4 to 7 in column A of Table 1, and said entities are further directed to enter; personal biometric characteristics and record also the data type of said biometric characteristics provided such data type being for example Static retinal or live motion retinal, or static facial, or live facial or static fingerprint and preferably live motion facial image but any of said biometric characteristics discussed elsewhere herein and referred to as Biometric Data Storage 1 represented at column C Rows 4 to 8 of Table 1 and Entities P1, P2, P3 & P4 and User 50 Biometric Data Storage 1 and Appl Access Data represented at Table 1 rows 4 to 8 and columns A. B, C, E & Fi are shown in FIG. 3 as 37 which is stored in Database 310. Said Entities P1 to P4 and User 50 may be further directed to repeat the acquisition of biometric data represented at Table 1 Column C rows 4 to 8 or copy the corresponding data stored in database 310 in a form suitable for a blockchain transaction to blockchain Node 110 and shown in FIG. 3 as 35 which is stored in a blockchain by blockchain Node 110. Said Entities P1, P2, P3, P4 and User 50 may also be invited or directed by Appl to enter further challenges and secret questions and answers and other static biometric data to enable recovery of access in certain circumstances. Collectively all foregoing data (Security Details) of the User 50 and trust group 60 comprising relatives friends of the User or in the case of corporate Users said trust group 60 comprising other officers of the corporation collectively referred to as (Trust Group 60), said Security Details obtained by known means and/or in the case of bio-metric data, created with a mobile phone or other device having electronic camera capability or other device (Biometric Data Capture), and store it electronically in Database 310 and sent to Blockchain node 110 as a transaction to be stored and is stored in a Blockchain and said Security Details, including image or images or other recording means of one or more of biometric characteristics of the User and the Trust Group and where appropriate recording of motion and said Biometric Data Capture stored so that said store of data relating to each individual may be accessed and stored separately (Biometric Data Storage).

Said Biometric Data or some of it is stored in more than one location and in the present invention example in 2 locations as shown in FIG. 3 as follows; a) firstly in FIG. 3 reference 37 in other storage on a mobile phone or other User device including storage such as personal or corporate cloud storage and/or in a database 310 (Biometric Data Storage 1). b) Secondly in FIG. 3 reference 35 is sent in a transaction in a secure blockchain (Biometric Data Storage 2) Connection F from Appl and or App2 to Database 310. Said database 310 is shown as being located in Cloud Computing 800 but said Database 310 may instead be located (not shown) to operate in a web browser within User Device 100.

c) Connection'E' which may be cloud communication means, enables Blockchain Nodes 110,17,15 and Peer-server 500 and API server 250 and Database 300 via 'C' to communicate as necessary bi-directionally across Network Address Translators via means of WebRTC. and PeerServer 500 leveraging PeerJS and WebRTC.

Figure 4:
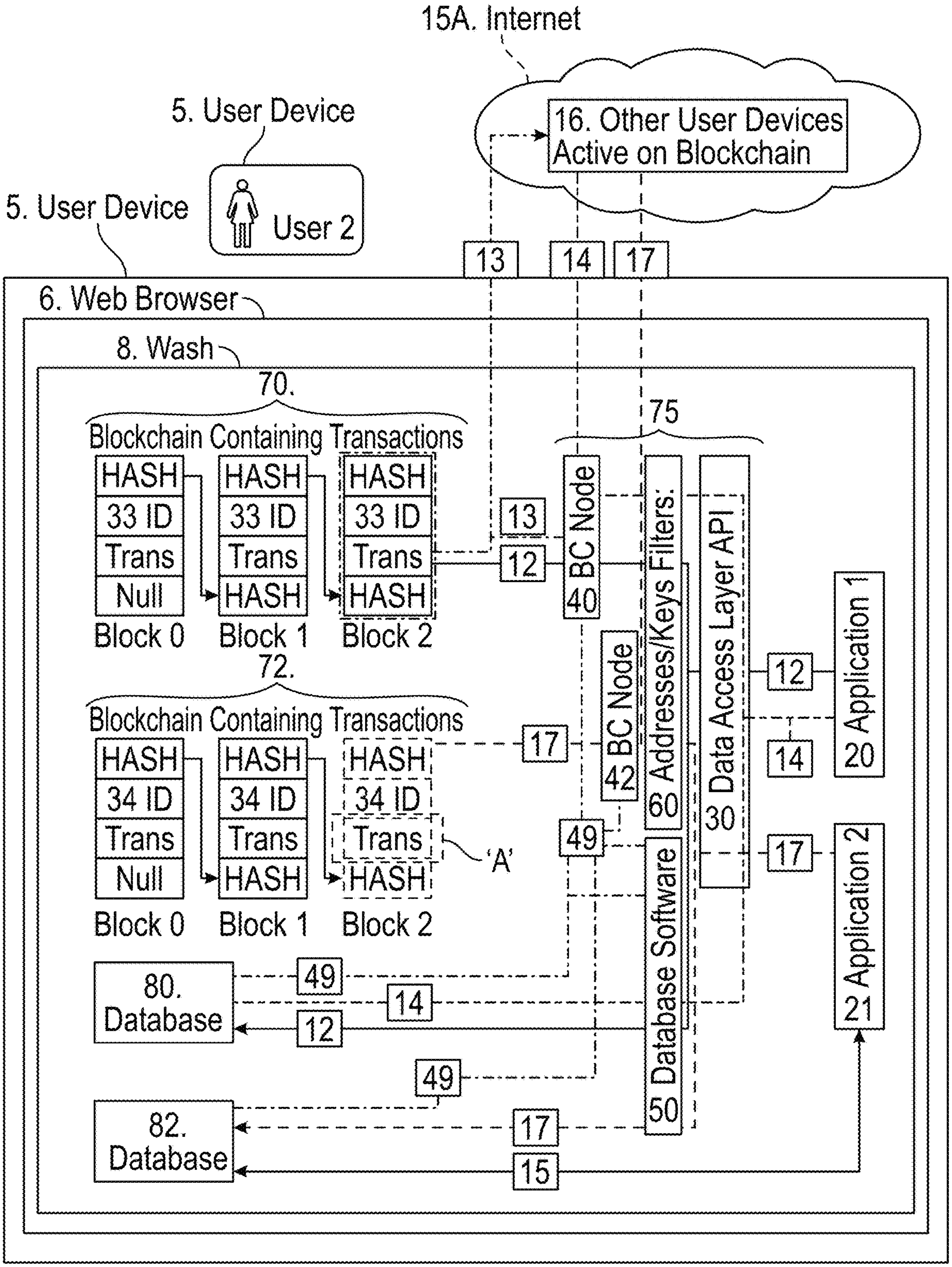
FIG. 4 is a block diagram of a system providing Users with at least one a personal Indexed Database linked to at least one Blockchain.

FIG. 4 Is a schematic diagram of a User 2 having User device 5 deploying a fully operational node (as distinct from a construct which is not communicating, or not able to communicate, with a group of its peers but in communication with one node of a blockchain may perform one but not all of the actions which are performed by a full or fully participating node of a blockchain sometimes described as a "lite node") of a blockchain 40 said node 40 having a full copy of the blockchain or Epoch/interval of a blockchain 70 and able to function as a fully participating node which may fulfil any of the actions and roles of nodes in the system.

Said user device 5 runs a web browser 6 containing or running an instance of a Web Assembly environment or WASM. Said WASM containing and facilitates running of one or more Applications 20 and 21 employed by the User, Software Stack 75 containing elements comprising or combining one or more of and/or employing the functionality of—Database Access Layer API software 30; Blockchain Node & Blockchain management software API 40. And 42; Database Software or database management system 50; Address Filter 60; and elements of said Software Stack 75 running and maintaining Blockchains 70, 72 & Databases 80, 82. Note: Positions of elements in stack are examples only and may vary and in another example of the present invention a single database contains all the blockchain transactions for which the User has private keys.

User 2 has accepted or been granted use of or purchased or licensed Application 20 and said User acquires the address and private key of the Application 20 or other means of obtaining valid access to said Application 20. User 2 uses Application 20 which creates a Database transaction 12 including a blockchain ID 33 and said transaction is passed to the Data Access Layer API 30. Said Data Access API Layer determines the transaction requires interaction with Blockchain Node and/or Database and in this instance both so the Transaction data is passed to Database Software 50 for immediate writing to the database 80. Then Data Access Layer API 30 translates or manipulates the database transaction instruction into code which it then compiles and passes the compiled code to Node API 40 and said Node software 40 is able to run unit tests as may be required against the compiled code of the transaction to test that it works or is valid or contains no malicious code and if it is valid, said Node API 40 then places the transaction in a queue of proposed transactions to be written into the blockchain as a transaction and sends a copy of the proposed transaction to all the blockchain Nodes it communicates with and these Nodes will also validate the Transaction. Said transaction will then be included in the next block to be written to the blockchain. Said transaction 12 is thereby written to a blockchain 70. and a Database 80 preferably with a flag or similar indicator (flag not shown but said flag is meant to indicate in the database that the transaction origin is the Application and has not yet been written into a block of the blockchain). Said blockchain transaction 12 is a proposed blockchain transaction in a proposed transaction queue, said blockchain transaction eventually becoming all or part of proposed new block. Block 2 and said proposed Block 2 sent (refer 13) to all Other User Devices 16. active on the blockchain system and said proposed new block, Block 2 is written by a selected Founder or blockwriter Node as Block 2.

After new Block 2 is written a copy of all new blocks including Block 2 is sent to all active nodes by the blockchain system and when received from the blockchain system (refer 14) Node software 40 identifies the blockchain ID 33, verifies the new block, removes from its pending transactions queue any pending transactions which have been included in the new block and applies an address filter 60. process by identifying and or decrypting any encrypted message or transaction in the received block 14 for which the Node has the private key for the target or recipient address or addresses and sends all decrypted transactions data from said new block to the Data Access Layer API software 30. and/or to the Database management software 50. So that said blockchain transaction data can be manipulated as necessary by Data Access Layer API software 30 and passed to Database management software 50 to be written to the database or if already in a form suitable for Database management software 50 to write the transaction data into the database or if already in a form suitable to write the transaction data into the database, to immediately write the transaction into the relevant database.

User 2 also uses another blockchain Application 21 to read a document by creating a transaction 15 which in this example Application 21 communicates directly to the Database Software 50 which recovers the document from the Database 82 and passes it to Application 21 which enables User 2 to read said retrieved document. In an alternate arrangement Application 21 may send the read request 15 to Data Access Layer API software 30 which determines requires a read request and passed to Database Software 50 which provides said document to Application 21.

In yet another example, application 21 also receives (referl7) a new Block 2 shown with dotted line outline to represent that said Block 2 has not yet been verified by the blockchain node of its blockchain 72 said new Block 2 is actually received by node software 42 managing said blockchain 72 and after receipt of any new block the blockchain node validates the block and in the process it determines if there are any transactions which have User related addresses. In this example the Node determines that there is one transaction in the said new Block 2 for which said Node 42 having read the Blockchain ID 34 as pertaining to its blockchain and said Node 42 having the Users private key and thereby decrypts and passes decrypted transaction data to the Data Access Layer API software 30 (DAL) and said DAL interprets the data and having determined that the data needs to be sent to database storage said DAL as necessary transcribes or manipulates data into appropriate form and sends said transaction data 17 to Database software 50 to be written into the database 82.

Nodes 40 and 42 software may also communicate directly with Database software 50 performing as depicted via connection 49 at least part of the function of what is also referred to as the DAL i.e. the node software performs this with and in communication with the database software. In yet another example of the present invention block chain nodes 40 and 42 and their respective Node management software may be replaced by a single node with node management software capable of managing multiple blockchains based on the Blockchain ID of each block refer Blockchain ID 33 in blocks contained in Blockchain 70 and Blockchain ID 34 in blocks contained in Blockchain 72 (Super Nodes).

Operation of said Super Nodes will require modifications to said PeerServer (not shown) software to enable issuing, recording and storage in or in association with said Peerserver of more than one blockchain ID address for Super Nodes so that said Peerserver can for example, in response to nodes requesting a list of active nodes for a particular blockchain, at least provide or include in a list of active nodes for a particular blockchain, the appropriate Super Node blockchain address or addresses.

Implementation of Super Nodes software would also require at least modification to software for 20 Application 1 and 21 Application 2 to correspond with obtaining of node addresses for a particular blockchain from said Peer server and advantageously also one or more modifications to other software to implement use of; Block chain ID's contained in each block; and or addresses or address portions additional to said User address, so that software for each of 20,21,30,50 and 60 (Software Elements) may implement appropriate actions based on said modifications including said Blockchain ID's. One example of such modifications would enable Database Access Layer API 30 and or Database management software 50 to identify or associate a database and/or write transaction with a particular blockchain ID and or particular transaction addresses or address portions and thus a Database and or a Blockchain may be at least addressable or searchable based on said Blockchain ID and/or said transaction address and/or said address portions.

Said Implementation of Super Nodes software could also enable, for example where an enterprise, having multiple blockchains and corresponding Databases, the exploration of the efficacy of the concept of creation of one or more of a Super Blockchain containing the transactions of all enterprise blockchains transactions and a Super Database containing the database transactions of each of the blockchain transactions in said enterprise blockchains.

User 2 also uses another blockchain Application 21 to read a document by creating a transaction 15 which in this example Application 21 communicates directly to the Database Software 50 which recovers the document from the Database 82 and passes it to Application 21 which enables User 2 to read said retrieved document.

In an alternate arrangement Application 21 may send the read request 15 to Data Access Layer API software 30 which determines requires a read request and passed to Database Software 50 which provides said document to Application 21.

Figure 4A:
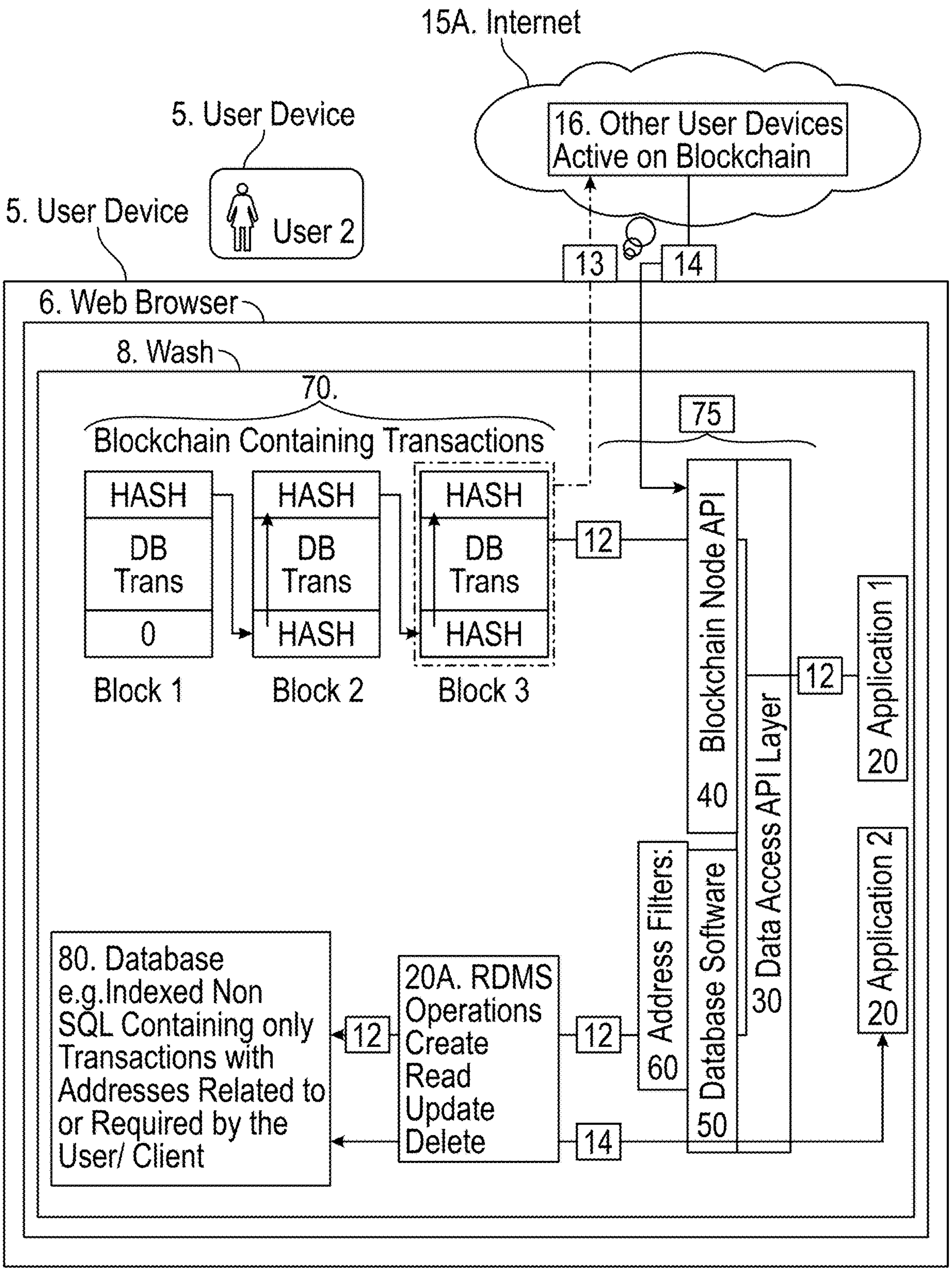
FIG. 4*a* is a block diagram of an alternate version of the system of FIG. 4.

FIG. 4A is a schematic diagram of another embodiment.

User 2 having User device 5 deploying a fully operational node (as distinct from a node sometimes described as a "lite node") of a blockchain 40 said node 40 having a full copy of the blockchain or Epoch/interval of a blockchain 70 and able to function as a fully participating node which may fulfil any of the roles of nodes in the system.

Said user device 5. runs a web browser 6. containing or running an instance of a Web Assembly environment or WASM. Said WASM containing and facilitates running of one or more Applications 20 and 21 employed by the User, Software Stack 75 containing elements comprising or combining one or more of and/or employing the functionality of—Database Access Layer API software 30; Blockchain Node & Blockchain management software API 40. And 42; Database Software or database management system 50; Address Filter 60; and elements of said Software Stack 75 running and maintaining Blockchains 70, 72 & Databases 80, 82. Note: Positions of elements in stack are examples only and may vary and in another example of the present invention a single database contains all the blockchain transactions for which the User has private keys.

User 2 has accepted or been granted use of or purchased or licensed Application 20 and said User acquires the address and private key of the Application 20 or other means of obtaining valid access to said Application 20. User 2 uses Application 20 which creates a Database transaction 12 which is passed to the Data Access Layer API 30.

Said Data Access API Layer determines the transaction requires interaction with Blockchain Node and/or Database and in this instance both so the Transaction data is passed to Database Software 50 for immediate writing to the database 80. Then Data Access Layer API 30 translates or manipulates the database transaction instruction into code which it then compiles and passes the compiled code to Node API 40 and said Node API 40 is able to run unit tests against the compiled code of the transaction to test that it works or is valid and if it is valid, said Node API 40 then places the transaction in a queue of proposed transactions to be written into the blockchain as a transaction and sends a copy of the proposed transaction to all the blockchain Nodes it communicates with and these Nodes will also validate the Transaction.

Said transaction will then be included in the next block to be written to the blockchain. Said transaction 12 is thereby written to a blockchain 70. and a Database 80 preferably with a flag or similar indicator (flag not shown but said flag is meant to indicate in the database that the transaction origin is the Application and has not yet been written into a block of the blockchain).

Said blockchain transaction 12 is a proposed blockchain transaction in a proposed transaction queue, said blockchain transaction eventually becoming all or part of proposed new block, Block 2 and said proposed Block 2 sent (refer 13) to all Other User Devices 16. active on the blockchain system and said proposed new block, Block 2 is written by a selected Founder or blockwriter Node as Block 2.

After new Block 2 is written a copy of all new blocks including Block 2 is sent to all active nodes by the blockchain system and when received from the blockchain system (refer 14) Node software 40 verifies the new block, removes from its pending transactions queue any transactions which have been included in the new block and applies an address filter 60. process by decrypting any message for which the Node has the private key for the target or recipient address and sends all decrypted transactions data from said new block to the Data Access Layer API software 30. and/or to the Database management software 50. So that said blockchain transaction data can be manipulated as necessary by Data Access Layer API software 30 and passed to Database management software 50 to be written to the database or if already in a form suitable for Database management software 50 to write the transaction data into the database or if already in a form suitable to write the transaction data into the database.

User 2 also uses another blockchain Application 21 to read a document by creating a transaction 15 which in this example Application 21 communicates directly to the Database Software 50 which recovers the document from the Database 82 and passes it to Application 21 which enables User 2 to read said retrieved document. In an alternate arrangement Application 21 may send the read request 15 to Data Access Layer API software 30 which determines requires a read request and passed to Database Software 50 which provides said document to Application 21

Figure 4B:
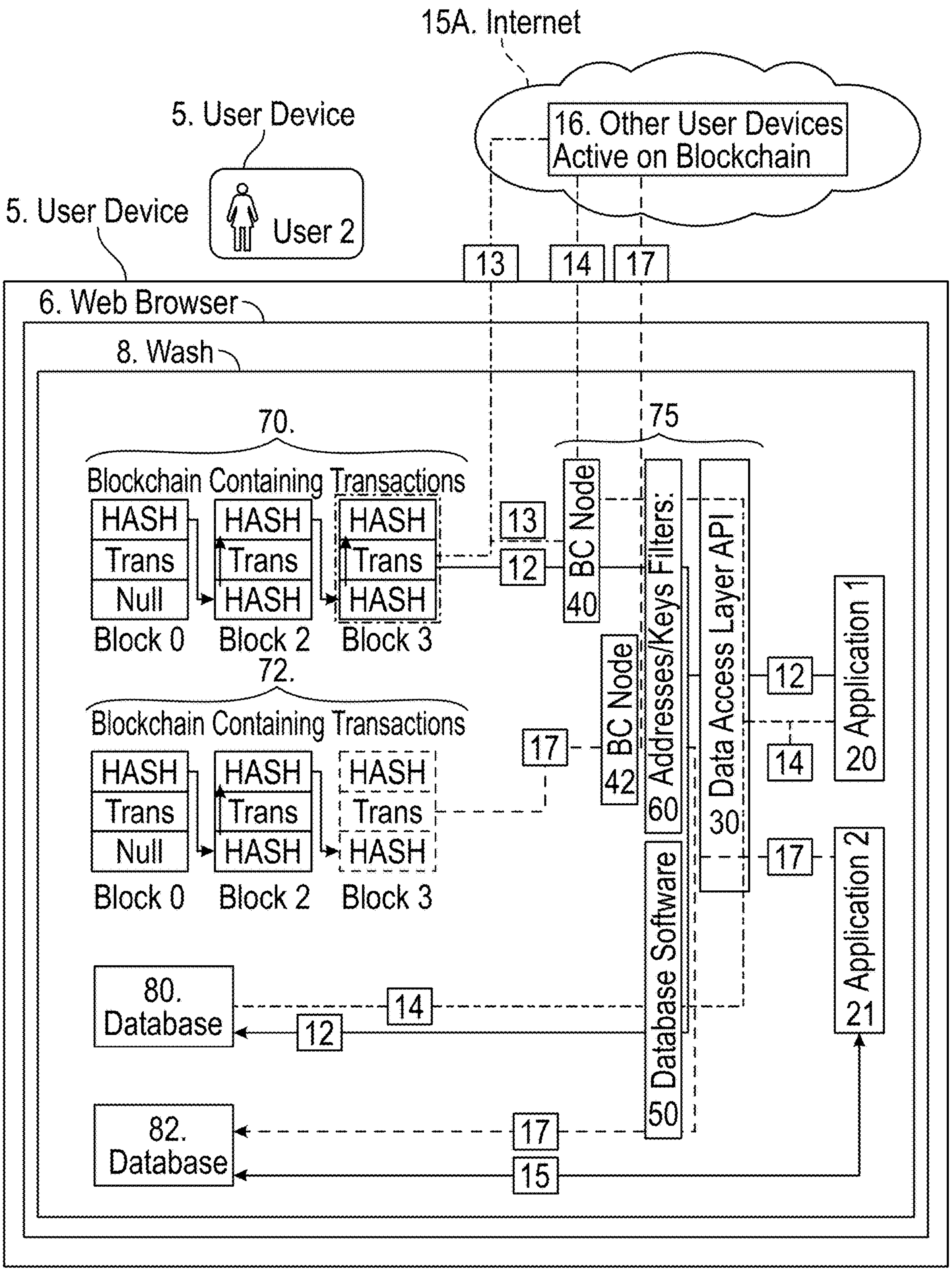
FIG. 4*b* is a block diagram of an alternate version of the system of FIG. 4.

In yet another example, application 21 also receives (referl7) a new Block 2 shown with dotted line outline to represent that said Block 2 has not yet been verified by the blockchain node of its blockchain 72 said new Block 2 is actually received by node software 42 managing said blockchain 72 and after receipt of any new block the blockchain node validates the block and in the process it determines if there are any transactions which have User related addresses. In this example the Node determines that there is one transaction in the said new Block 2 for which said Node 42 has the Users private key and thereby decrypts and passes decrypted transaction data to the Data Access Layer API software 30 (DAL) and said DAL interprets the data and having determined that the data needs to be sent to database storage said DAL as necessary transcribes or manipulates data into appropriate form and sends said transaction data 17 to Database software 50 to be written into the database 82. FIG. 4*b* Is a schematic diagram of a User 2 having User device 5 deploying a fully operational node (as distinct from a node sometimes described as a "lite node") of a blockchain 40 said node 40 having a full copy of the blockchain or Epoch/interval of a blockchain 70 and able to function as a fully participating node which may fulfil any of the roles of nodes in the system.

Said user device 5. runs a web browser 6. containing or running an instance of a Web Assembly environment or WASM. Said WASM containing and facilitates running of one or more Applications 20 and 21 employed by the User, Software Stack 75 containing elements comprising or combining one or more of and/or employing the functionality of—Database Access Layer API software 30; Blockchain Node & Blockchain management software API 40; Database Software or database management system 50; Address Filter 60; and elements of said Software Stack 75 running and maintaining Blockchains 70, 72 & Databases 80, 82. Note: Positions of elements in stack are examples only and may vary and in another example of the present invention a single database contains all the blockchain transactions for which the User has private keys.

User 2 has accepted or been granted use of or purchased or licensed Application 20 and said User acquires the address and private key of the Application 20 or other means of obtaining valid access to said Application 20. User 2 uses Application 20 which creates a Database transaction 12 which is passed to the Data Access Layer API.

Said Data Access API Layer determines the transaction requires interaction with Node and/or Database and in this instance both so the Transaction data is passed to Database Software 50 for immediate writing to the database 80. Then Data Access Layer API 30 translates the database instruction code into text which it then compiles and passes the compiled code to Node API 40 and said Node API 40 runs unit tests against the compiled code of the transaction to test that it works or is valid and if it is valid, said Node API 40 then places the transaction in a queue of proposed transactions to be written into the blockchain as a transaction and sends a copy of the proposed transaction to all the blockchain Nodes it communicates with and these Nodes will also validate the Transaction. Said transaction will then be included in the next block to be written to the blockchain. Said transaction 12 is thereby written to a blockchain 70. and a Database 80 preferably with a flag or similar indicator (flag not shown but said flag is meant to indicate in the database that the transaction has not yet written into a block of the blockchain) but is a transaction in a proposed transaction queue, said blockchain transaction eventually becoming all or part of proposed new block, Block 3, and said proposed Block 3 sent (refer 13) to all Other User Devices 16. active on the blockchain system and said proposed new block, Block 3 is written by a selected Founder or blockwriter Node as Block 3. After new Block 3 is written a copy of all new blocks including Block 3 is sent to all active nodes by the blockchain system and when received from the blockchain system (refer 14) Node software 50 verifies the new block, removes from its pending transactions queue any transactions which have been included in the new block and applies an address filter 60. process by decrypting any message for which the Node has the private key and sends all decrypted transactions data from said new blocks to the Data Access Layer API software 30. and/or to the Database management software 50. So that said blockchain transaction data can be manipulated as necessary by Data Access Layer API software 30 and passed to Database management software 50 to be written to the database or if already in a form suitable for Database management software 50 to write the transaction data into the database. Application 21 may also deal directly with the said Database Management Software 50 for exam. Node does this Said Database Software 50 updates the relevant Database 80 existing unverified transactions entries to remove any corresponding "not verified" flags, and or creates new Database entries for each of said new "identified" blockchain transactions.

After new Block 3 is written a copy of all new blocks including Block 3 is sent to all active nodes by the blockchain system and when received from the blockchain system (refer 14) Node software 50 verifies the new block, removes from its pending transactions queue any transactions which have been included in the new block and applies an address filter 60. process by decrypting any message for which the Node has the private key and sends all decrypted transactions data from said new blocks to the Data Access Layer API software 30. and/or to the Database management software 50. So that said blockchain transaction data can be manipulated as necessary by Data Access Layer API software 30 and passed to Database management software 50 to be written to the database or if already in a form suitable for Database management software 50 to write the transaction data into the database. Application 21 may also deal directly with the said Database Management Software 50 for exam. Node does this Said Database Software 50 updates the relevant Database 80 existing unverified transactions entries to remove any corresponding "not verified" flags, and or creates new Database entries for each of said new "identified" blockchain transactions.

User 2 also uses another blockchain Application 21 to read a document by creating a transaction 15 which in this example Application 21 communicates directly to the Database Software 50 which recovers the document from the Database 82 and passes it to Application 21 which enables User 2 to read said retrieved document. In an alternate arrangement Application 21 may send the read request 15 to Data Access Layer API software 30 which determines requires a read request and passed to Database Software 50 which provides said document to Application 21 In yet another example, application 21 also receives (referl7) a new Block 3 shown with dotted line outline to represent that said block 3 has not yet been verified by the blockchain node of its blockchain 72 said new block 3 is actually received by node software 42 managing said blockchain 72 and after receipt of any new block the blockchain node validates the block and in the process it determines if there are any transactions which have User related addresses. In this example the Node determines that there is one transaction in the said new Block 3 for which said Node 42 has the Users private key and thereby decrypts and passes decrypted transaction data to the Data Access Layer API software 30 (DAL) and said DAL interprets the data and having determined that the data needs to be sent to database storage said DAL sends said transaction data 17 to Database software 50 to be written into the database 82.

Figure 5:
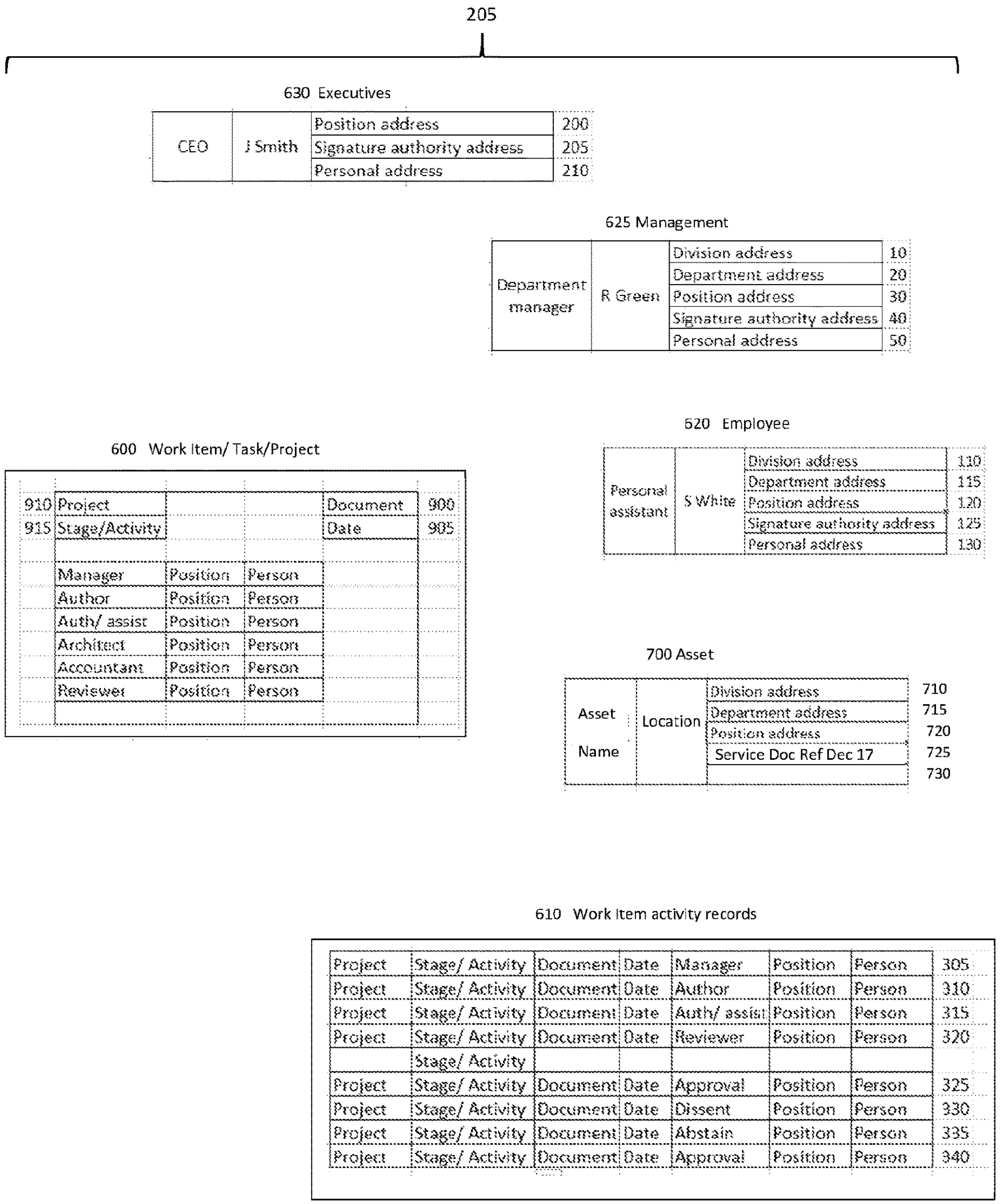
FIG. 5 is a block diagram of an example of a document record system to be used association with a blockchain and indexed database system.

FIG. 5 is a schematic showing another embodiment of a present invention whereby blockchain addresses and or address parts forming a blockchain address or a structured address string as a blockchain address may be applied to identify personnel, personnel roles and actions, documents and artifacts, work items, personnel actions/activity, authorisations or indeed any item or thing relevant to the work flow and efficient operation of a business and which may be documented can be given a blockchain address or can form part of a structured blockchain address system and method as depicted in System 205 whereby personnel generally are provided with blockchain addresses or address strings containing address parts identifying aspects of personnel involvement and contribution to the work flow and advancement of an enterprise. Personnel 630 are provided at least with Position address 200, Signature authority address 205 and personal address 210. Personnel 625 are also provided with blockchain addresses or address strings containing address parts identifying aspects of personnel involvement and contribution to the workflow and advancement of an enterprise such as a Division address 10, a Department Address 20, a Position address 30, Signature authority address 40 and personal address 50.

Personnel 620 are also provided with blockchain addresses or address strings containing address parts identifying aspects of personnel involvement and contribution to the workflow and advancement of an enterprise such as a Division address 110, a Department Address 115, a Position address 120, Signature authority address 125 and personal address 130.

Said addresses and or address parts may collectively be in the form of a QR code such that the address could be easily read/recorded by a user device such as a mobile phone.

FIG. 5 provides a present example of addresses and tracking of various elements relating to efficient operations of businesses including the concepts of;

1) Work items or tasks ID 600 and implementing use same having a
a); Project or Task ID 910;
b) Document Id 900;
c) Identifying Stage or activity of a project ID 915;
d) Identifying Work items relating to said project or task
e) Identifying Personnel responsible for or contributing to advancement of said project or task
2) Work Item activity persona or identity references for each document, task or event number/transactional event and showing in the example in FIG. 5 at 610 Work item activity records identifying the various persona and actions within or comprising one or more of:—a) A particular Manager entities function/position within the enterprise ID 305;
b) A particular Author entity re a document or task ID 310;
C) A particular Authors Assistant entity re a document or task ID 315;
d) A particular Reviewer entity re a document or task ID 320;
e) A particular Approval action ID 325 particular to an entity regarding a decision on a task or work item 910 at a stage 915;
f) A particular Dissent action ID 330 particular to an entity regarding a decision on a task or work item 910 at a stage 915;
g) A particular Abstaining vote action ID 335 particular to an entity regarding a decision on a task or work item 910 at a stage 915; h) A particular address ID identifying one or more of Division, Department, Position,
Signature authority applied or given, or personal address for use within an enterprise so as to differentiate between official and personal communications within an enterprise and or any other address which may be applicable to an entity, employee or contractor to an enterprise or actions by said entity, employee or contractor in relation to an enterprise and in the present example respectively ID 10,20,30,40 and 50 in group 625 and similarly in group 620 (or separately in group 620 respectively at 110, 115, 120, 125 and 130 if it were determined desirable to separately identify and access this level of ID between groups 620 and 625) and ID 200 in group 630 in FIG. 5.
3) Tracking of assets 700 and ownership responsibilities 710, 715, 720 and events 725 relating thereto including identification of persona involved in any related action or event and details of actions or events.

Figure 6:
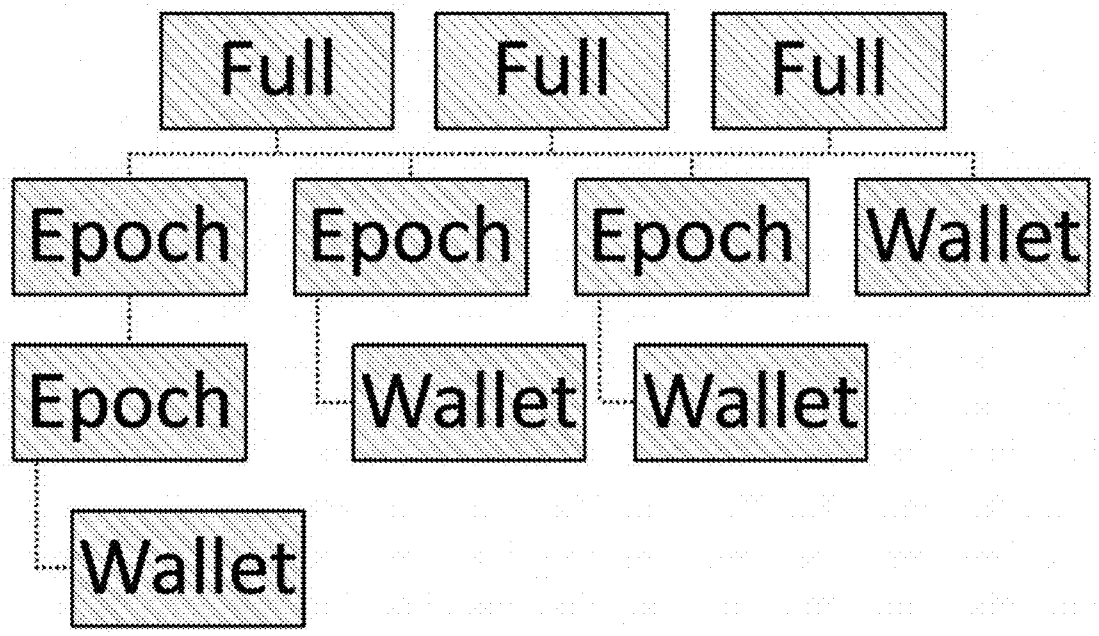
FIG. 6 is a block diagram illustrating a hierarchical node architecture of a distributed system.

FIG. 6 is a block diagram illustrating an exemplary tree structure of a network topology. The diagram depicts a top layer of full nodes mapped to a lower layer of epoch and wallet nodes, including further sub-level dependencies between the epoch and wallet nodes.

Figure 7:
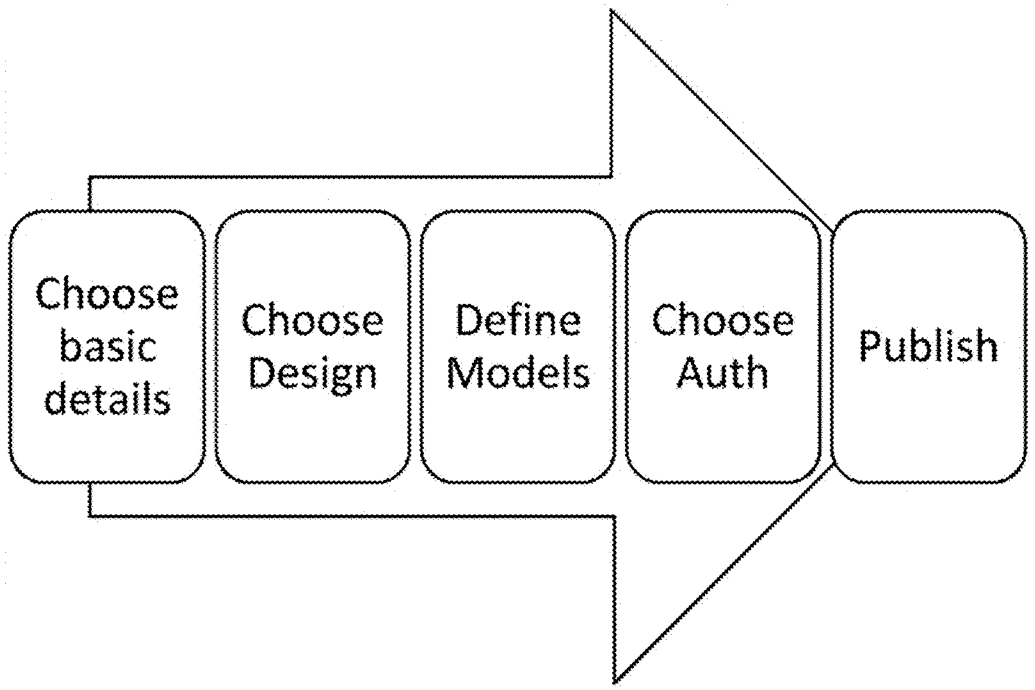
FIG. 7 is a flowchart illustrating an exemplary sequential process for developing and deploying an application.

FIG. 7 is a block diagram illustrating a series of method steps for an application lifecycle, tracking a progression from initial configuration steps consisting of detail selection, design selection, model definition, and authentication selection through to a final publication stage.

Figure 8:
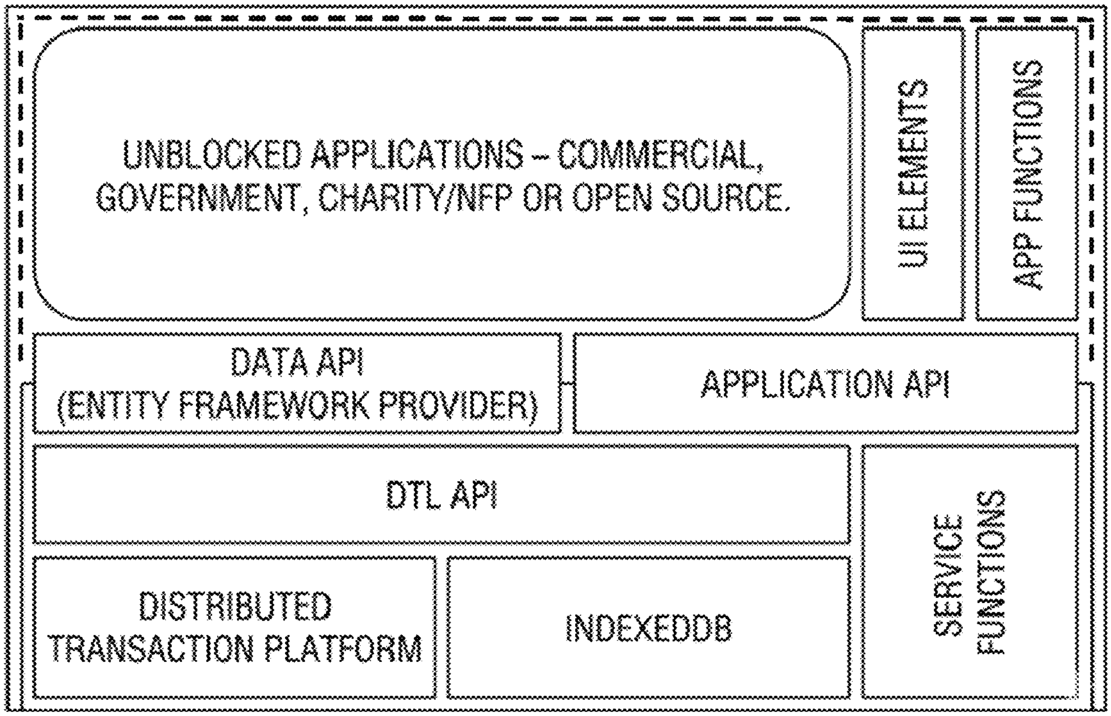
FIG. 8 is a block diagram illustrating a multi-tier system architecture

FIG. 8 is a block diagram illustrating a software framework architecture. The diagram depicts an application-level layer segmented by a dashed boundary from an underlying system layer, wherein the application-level layer includes user interface and application functions, and the system layer provides data, transaction, and storage APIs.

While there has been shown and described at least one preferred embodiment of an Improved computer architecture supporting simpler and more secure blockchains, it will be appreciated that many changes and modifications may be made therein without, however, departing from the essential spirit thereof.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents.

Information, arguments, parameters, data, etc. may be passed, forwarded, or transmitted via any suitable means including memory sharing, message passing, token passing, network transmission, etc.

In the foregoing, a storage medium may represent one or more devices for storing data, including read-only memory (ROM), random access memory (RAM), magnetic disk storage mediums, optical storage mediums, flash memory devices and/or other machine-readable mediums for storing information. The terms "machine readable medium" and "computer readable medium" include but are not limited to portable or fixed storage devices, optical storage devices, and/or various other mediums capable of storing, containing or carrying instruction(s) and/or data. The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, circuit, and/or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied in a software module executable by a processor in the form of programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

One or more of the components and functions illustrated the figures may be rearranged and/or combined into a single component or embodied in several components without departing from the invention. Additional elements or components may also be added without departing from the invention. Additionally, the features described herein may be implemented in software, hardware, as a business method, and/or combination thereof.

In its various aspects, the invention can be embodied in a computer-implemented process, a machine (such as an electronic device, or a general purpose computer or other device that provides a platform on which computer programs can be executed), processes performed by these machines, or an article of manufacture. Such articles can include a computer program product or digital information product in which a computer readable storage medium containing computer program instructions or computer readable data stored thereon, and processes and machines that create and use these articles of manufacture.

The invention claimed is:

1. A distributed computing system configured to enable a network of users of the system to participate in one more transactions, comprising:

a distributed ledger system comprising:

a network of computing devices including at least one group of user nodes in communication with one another to participate in transacting and recording transactions in at least one associated blockchain, each node being associated with at least one processor and at least one computer readable medium, at least one user node in the group being initiated and operable via an instance of one or more web-application(s) running in a web-browser executed by one or more associated computing device(s), the web-application(s) being configured to initiate and operate an associated user node to participate in transacting and recording transactions for at least one blockchain of at least one group of user nodes by:

obtaining a node address for the associated user node for each of the at least one blockchains that the user node is configured to participate in, the node address including an indication of each associated blockchain;

requesting data indicative of a current iteration of the blockchain from the group of user nodes, without downloading the entire chain, and storing the current iteration of each blockchain in electronic memory of the computing device(s) associated with the user node, for each of the at least one blockchains that the user node is configured to participate in; and enabling the associated user node to:

communicate with the group of user nodes to participate in transactions with the group of user nodes, for each of the at least one blockchains that the user node is configured to participate in, and carry out one or more blockchain-related tasks including creating, updating and/or maintaining each of the at least one blockchains based on the transactions between the group of user nodes, for each of the at least one blockchains that the user node is configured to participate in:

the network of computing devices enabling at least one ephemeral user node of at least one group of user nodes to temporarily join and operate within the group of user nodes by initiating a temporary instance of the respective web application(s), wherein at least one ephemeral user node is configured to initiate participation in blockchain-related transactions through execution of the web application at the user device, the ephemeral user node being configured to access the blockchain(s) during the temporary execution instance of the respective web application(s), wherein the ephemeral node is configured to temporarily join the network of user nodes to carry out the blockchain-related tasks in association with at least one blockchain during an active session of the ephemeral user node;

one or more databases accessible by the at least one node of at least one group of user nodes for recording and reading data relating to one or more transactions of each of the at least one blockchain of the distributed ledger system;

wherein the one or more transactions stored in the one or more databases are configured to be sent to data access layer software, the data access layer software being configured to assemble transaction messages and to route the assembled transaction messages to one or more system components for processing and storage in at least one of the one or more blockchains and at least one of the one or more databases; and wherein the data access layer software is configured to associate one or more transactions stored in one or more of the databases with a temporary status indicator during pending validation on one or more blockchains, and to update or remove the temporary status indicator after each transaction has been confirmed on a blockchain.

2. The distributed computing system as claimed in claim 1, wherein at least one blockchain of the distributed ledger system is substantially synchronized with the one or more databases such that transactions stored in each of the at least one blockchains are also stored in the one or more databases;

wherein each user node of at least one group of user nodes is configured to execute data access layer software for translating blockchain-related transaction data acquired from the one or more databases to data suitable for use as a transaction in the distributed ledger system;

wherein each user node of at least one group of user nodes is configured to execute data access layer software for translating blockchain-related transaction data acquired from the distributed ledger system to data suitable for use to store as a transaction in the one or more databases;

wherein each user node of at least one group of user nodes is configured to execute database management software for enabling the node to create, read, update and/or delete one or more blockchain related transactions on the one or more databases; and wherein each user node of at least one group of user nodes is configured to execute database management software for enabling the node to transmit one or more blockchain related transactions stored in the one or more databases to the user node for use in distributed ledger system.

3. The distributed computing system as claimed in claim 2, wherein each computing device is configured to execute address filtering software for identifying blockchain-related transactions originating from the node software or from the database management software for each node address related to a particular user node, for each of the at least one blockchains.

4. The distributed computing system as claimed in claim 1, wherein the network of user nodes is operable to enable at least one ephemeral user node to temporarily join and operate within the at least one group of user nodes, and to rejoin and operate within the at least one group of user nodes during multiple independent instances of the respective one or more web application(s).

5. The distributed computing system as claimed in claim 4, wherein at least one database of the one or more databases is associated with at least one user node of at least one group of user nodes and wherein for each of the at least one user node, the transactions of each of at least one blockchain associated with the user node are stored in the corresponding databases(s) and accessible by the user node;

wherein the at least one user node in at least one of the group(s) of user nodes is configured to obtain executable code from associated computer-readable medium, including from a blockchain, to perform the one or more blockchain-related tasks, or to facilitate creation or launching of an instance of a distributed computing application;

wherein the network of computing devices includes a server and a database, and the at least one user node in at least one of the group(s) of user node is configured to access and execute the blockchain related tasks by communicating with the server and the database.

6. The distributed computing system as claimed in claim 4, wherein at least one user node in at least one of the group(s) of user nodes is configured to obtain data indicative of the current iteration of each of the at least one blockchains from corresponding peer user nodes in the group of user nodes, for enabling the execution of the blockchain-related task(s).

7. The distributed computing system as claimed in claim 4, wherein at least one ephemeral user node is a full-node, wherein the full-node is operable to execute a mining task of the blockchain-related tasks for selecting a node within the network to write a next validated block to each of the at least one blockchains;

wherein the mining task is operative using a proof-of-stake method.

8. The distributed computing system as claimed in claim 4, wherein one or more transactions executed and stored via the distributed ledger system and/or via the one or more databases have associated therewith any one or more of the following identifiers: user identifier, blockchain identifier, hierarchy level identifiers associated with a hierarchy system for a group of the user nodes, and/or an entity identifier associated with a user node.

9. The distributed computing system as claimed in claim 1, wherein the network of computing devices is configured to verify a predetermined user identity associated with a user node prior to the user node establishing communication with at least one other user node in a group of user nodes, for the purposes of carrying out one or more blockchain-related tasks;

wherein verifying the predetermined user identity comprises a two-factor authentication process.

10. The distributed computing system as claimed in claim 9, wherein the two-factor authentication process includes a biometric identification stage where a predetermined biometric characteristic of a user associated with the user node is verified.

11. The distributed computing system as claimed in claim 10, wherein at least one user node of at least one group of user nodes is configured to access and maintain in an associated computing device, a database containing only transactions associated with at least one node address related to the user node.

12. The distributed computing system as claimed in claim 10, wherein each user node of at least one group of user nodes is configured to access data stored in the database(s) relating to transactions associated with the user node.

13. A method for maintaining at least one blockchain stored in a distributed ledger system, the method comprising:

enabling communication between a network of computing devices including at least one group of user nodes in communication with one another to participate in transacting and recording transactions in each of the at least one blockchains, each node being associated with at least one processor and at least one computer readable medium, enabling at least one user node in at least one of the group(s) of user nodes to be initiated and operable via an instance of one or more web-application(s) running in a web-browser executed by one or more associated computing device(s), the web-application(s) being configured to initiate and operate an associated user node to participate in transacting and recording transactions for at each of the least one blockchains of at least one group of user nodes by:

obtaining a node address for the associated user node for each of the at least one blockchains that the user node is configured to participate in, the node address including an indication of the each associated blockchain;

requesting data indicative of a current iteration of each of the at least one blockchains from the group of user nodes and storing the current iteration of the blockchain in electronic memory of the computing device(s) associated with the user node, for each of the at least one black chains that the user node is configured to participate in; and enabling the associated user node to:

communicate with the group of user nodes to participate in transactions with the group of user nodes, for each of the at least one blockchains that the user node is configured to participate in, and carry out one or more blockchain-related tasks including creating, updating and/or maintaining each of the at least one blockchains based on the transactions between the group of user nodes, for each of the at least one blockchains that the user node is configured to participate in; and enabling at least one ephemeral user node of at least one group of user nodes to temporarily join and operate within the group of user nodes by initiating a temporary instance of the respective web application(s), the at least one ephemeral user node is configured to participate in blockchain-related transaction(s) through execution of the web application at the user device, the ephemeral user node being configured to access the blockchain(s), during the temporary execution instance, wherein the ephemeral node is configured to temporarily join the network of user nodes to carry out the blockchain-related tasks in association with at least one blockchain during an active session of the ephemeral user node; and utilizing at least one or more databases accessible by the network of nodes for creating, maintaining and updating the one or more transactions each of the at least one blockchains maintained by at least one of the group(s) of user nodes;

wherein the one or more transactions stored in the one or more databases are configured to be sent to a data access layer software, the data access layer software being configured to assemble transaction messages and to route the assembled transaction messages to one or more system components for processing and storage in at least one of the one or more blockchains and at least one of the one or more databases; and wherein the data access layer software is configured to associate one or more transactions stored in one or more of the databases with a temporary status indicator during pending validation on one or more blockchains, and to update or remove the temporary status indicator after each transaction has been confirmed on a blockchain.

14. A method for enabling the development of the distributed computing system as claimed in claim 13, the method comprising providing access to one or more application interfaces for enabling the generation of web-application(s) executable by the one or more computing device(s).

15. The distributed computing system as claimed in claim 1, comprising one or more application interfaces for enabling the generation of web-application(s) executable by the one or more computing device(s).

* * * * *